US012568081B2

(12) United States Patent
Nalluri et al.

(10) Patent No.: US 12,568,081 B2
(45) Date of Patent: Mar. 3, 2026

(54) METHODS AND APPARATUS FOR VOICE TRANSFORMATION, AUTHENTICATION, AND METADATA COMMUNICATION

(71) Applicant: McAfee, LLC, San Jose, CA (US)

(72) Inventors: Srikanth Nalluri, Bangalore (IN);
Dattatraya Kulkarni, Bangalore (IN);
Ayush Agarwal, Bihar (IN)

(73) Assignee: McAfee, LLC, San Jose, CA (US)

( * ) Notice: Subject to any disclaimer, the term of this patent is extended or adjusted under 35 U.S.C. 154(b) by 215 days.

(21) Appl. No.: 18/354,468

(22) Filed: Jul. 18, 2023

(65) Prior Publication Data

US 2025/0030685 A1      Jan. 23, 2025

(51) Int. Cl.
*H04L 9/40* (2022.01)
*G10L 17/02* (2013.01)
(Continued)

(52) U.S. Cl.
CPC .......... *H04L 63/0861* (2013.01); *G10L 17/02* (2013.01); *G10L 17/06* (2013.01); *G10L 21/007* (2013.01)

(58) Field of Classification Search
CPC ..... H04L 63/0861; G10L 17/02; G10L 17/06; G10L 21/007; G10L 21/003;
(Continued)

(56) References Cited

U.S. PATENT DOCUMENTS 5,127,043 A * 6/1992 Hunt ........................ G10L 17/00
                                                               379/189
5,677,989 A * 10/1997 Rabin ...................... G07C 9/37
                                                               704/E17.015
(Continued)

FOREIGN PATENT DOCUMENTS

CN       105304088 A      2/2016
KR       20190142056 A    12/2019
WO       2021137754 A1    7/2021

OTHER PUBLICATIONS

Zheng et al., "Interactive Speech and Noise Modeling for Speech Enhancement," AAAI 2021, dated Dec. 17, 2020, 9 pages.
(Continued)

*Primary Examiner* — Brian Whipple
(74) *Attorney, Agent, or Firm* — Hanley, Flight & Zimmerman, LLC

(57)                ABSTRACT

Methods and apparatus for voice transformation, authentication, and metadata communication are disclosed. An example apparatus includes interface circuitry, machine readable instructions, and programmable circuitry to identify an enrollment voice associated with the account, a first voice transformation applied to a first voice input to produce the enrollment voice, the first voice transformation to cause the enrollment voice to include first voice-specific features different from second voice-specific features of the first voice input, access a transformed voice associated with a second voice input provided in association with a request to access the account from a user device, the first voice transformation or a second voice transformation to cause the transformed voice to have third voice-specific features different from fourth voice-specific features of the second voice input, and determine whether to provide the user device access to the account based on the first voice-specific features and the third voice-specific features.

20 Claims, 17 Drawing Sheets

(51) Int. Cl.
  *G10L 17/06* (2013.01)
  *G10L 21/007* (2013.01)
(58) Field of Classification Search
  CPC . G10L 2021/0135; G10L 17/04; G10L 17/22;
  G06F 21/32
  See application file for complete search history.

(56) References Cited

U.S. PATENT DOCUMENTS

| | | | | |
|---|---|---|---|---|
| 9,042,867 | B2 * | 5/2015 | Gomar | H04W 12/06 |
| | | | | 455/411 |
| 2017/0163620 | A1 | 6/2017 | Muttik et al. | |
| 2018/0342257 | A1 * | 11/2018 | Huffman | G10L 15/063 |
| 2020/0135169 | A1 * | 4/2020 | Deng | G10L 13/00 |
| 2023/0267936 | A1 * | 8/2023 | Vair | G06N 3/047 |
| | | | | 704/232 |
| 2024/0127803 | A1 * | 4/2024 | Mohajer | G10L 15/063 |

OTHER PUBLICATIONS

Verma, "Complete Guide to Bidirectional LSTM (With Python Codes)," Analytics India Magazine, retrieved from https://analyticsindiamag.com/complete-guide-to-bidirectional-Istm-with-python-codes/#:~:text=BI%2DLSTM(Bi%2Ddirectional,forward(past%20to%20future, published Jul. 17, 2021, 25 pages.

Wikipedia, "Mel-frequency cepstrum," Wikipedia, retrieved from https://en.wikipedia.org/wiki/Mel-frequency_cepstrum#:~:text=Mel%2Dfrequency%20cepstral%20coefficients%20(MFCCs,%2Da%2Dspectrum%22), last edited on Oct. 25, 2023, 6 pages.

Mathworks, "Speaker verification Using Gaussian Mixture Model," MathWorks Inc., retrieved from https://www.mathworks.com/help/audio/ug/speaker-verification-using-gaussian-mixture-model.html, retrieved on Oct. 30, 2023, 21 pages.

HASSAN er al., "Efficient Implementation of Radon Transform and Encryption Techniques for Cancelable Speaker Identification," Menoufia Journal of Electronic Engineering Research (MJEER), vol. 30, No. 2, Jul. 2021, pp. 70-78, ISSN: 1687-1189, DOI: 10.21608/mjeer. 2021.195521, 9 pages.

Chen et al., "SEC4SR: A Security Analysis Platform for Speaker Recognition", arxiv.org, Cornell University Library, 201 Olin Library Cornell University Ithaca, NY 14853, Sep. 4, 2021 (Sep. 4, 2021), XP091051621, 22 pages.

Agarwal et al., "Significance of Prosody Modification in Privacy Preservation on speaker verification", 2022 National Conference on Communications (NCC), IEEE, May 24, 2022 (May 24, 2022), pp. 245-249, DOI: 10.1109/NCC55593.2022.9806769 [retrieved on Jul. 4, 2022], 5 pages.

European Patent Office, "Extended European Search Report," issued in connection with European Patent Application No. 24186378.6, dated Oct. 28, 2024, 7 pages.

Intellectual Property Office, "Combined Search and Examination Report," issued in connection with Great Britain Patent Application No. 2410110.7, dated Jan. 14, 2025, 7 pages.

Kabir et al., "A Survey of Speaker Recognition: Fundamental Theories, Recognition Methods and Opportunities," IEEE Access, May 27, 2021, retrieved from <doi.org/10.1109/ACCESS.2021. 3084299> on Dec. 24, 2025, 28 pages.

Abd El-Wahab et al., "A Cancelable Biometric Approach for Efficient Identification of Speakers from Encrypted Speech," Wireless Personal Communications, Apr. 25, 2022, retrieved from <doi. org/10.1109/ACCESS.2021.3084299> on Dec. 24, 2025, 23 pages.

European Patent Office, "Communication pursuant to Article 94(3) EPC," issued in connection with European Patent Application No. 24186378.6, dated Dec. 9, 2025, 6 pages.

* cited by examiner

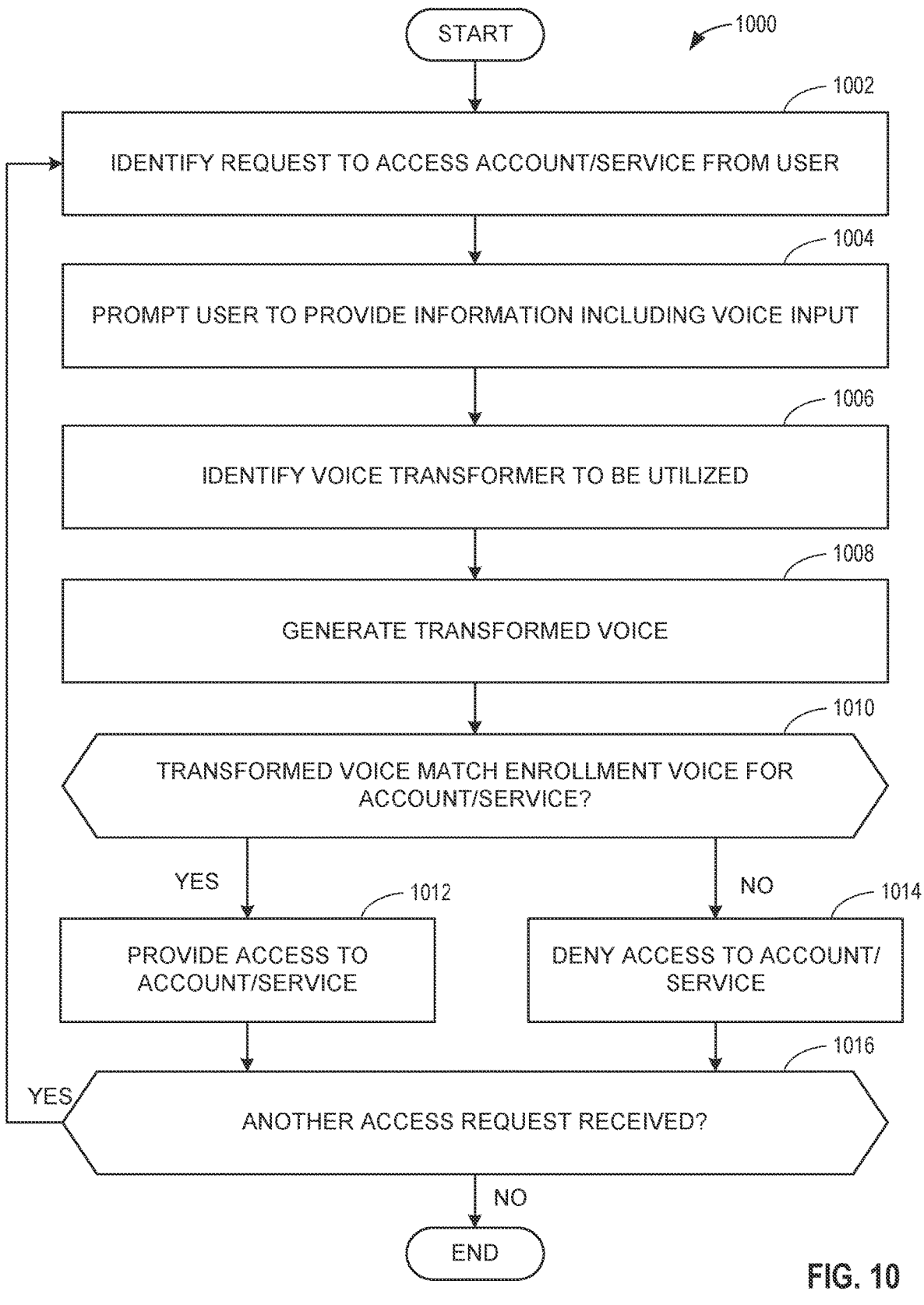

START

1000

1002
IDENTIFY REQUEST TO ACCESS ACCOUNT/SERVICE FROM USER

1004
PROMPT USER TO PROVIDE INFORMATION INCLUDING VOICE INPUT

1006
IDENTIFY VOICE TRANSFORMER TO BE UTILIZED

1008
GENERATE TRANSFORMED VOICE

1010
TRANSFORMED VOICE MATCH ENROLLMENT VOICE FOR ACCOUNT/SERVICE?

YES

1012
PROVIDE ACCESS TO ACCOUNT/SERVICE

NO

1014
DENY ACCESS TO ACCOUNT/ SERVICE

1016
YES
ANOTHER ACCESS REQUEST RECEIVED?

NO

END

FIG. 10

METHODS AND APPARATUS FOR VOICE TRANSFORMATION, AUTHENTICATION, AND METADATA COMMUNICATION

FIELD OF THE DISCLOSURE

This disclosure relates generally to user account security and, more particularly, to methods and apparatus for voice transformation, authentication, and metadata communication.

BACKGROUND

In recent years, voice-based applications, such as voice interactions with digital systems in the form of voice assistants, voice-based text inputs etc., have encountered continued growth. A person's voice has unique characteristics, which can be utilized to identify a user. Voice-based authentication continues to grow in popularity and is likely to become commonplace.

BRIEF DESCRIPTION OF THE DRAWINGS

FIG. 10 is a flowchart representative of example machine readable instructions and/or example operations that may be executed, instantiated, and/or performed by example programmable circuitry to implement the user device and/or the service provider circuitry of FIGS. 2-3.

In general, the same reference numbers will be used throughout the drawing(s) and accompanying written description to refer to the same or like parts. The figures are not necessarily to scale.

Figure 1:
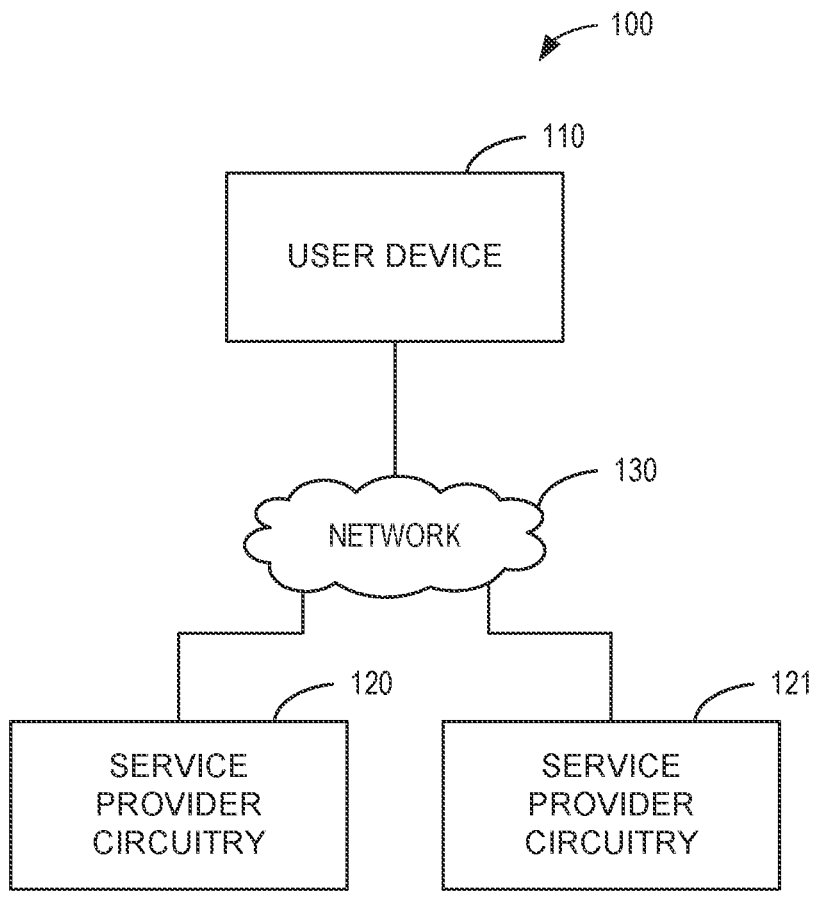
FIG. 1 is a block diagram of an example environment in which an example voice transformation and authentication system operates to transform a voice of a user and analyze the transformed voice to determine whether the user is authorized to access a service or system.

Unless specifically stated otherwise, descriptors such as "first," "second," "third," etc., are used herein without imputing or otherwise indicating any meaning of priority, physical order, arrangement in a list, and/or ordering in any way, but are merely used as labels and/or arbitrary names to distinguish elements for ease of understanding the disclosed examples. In some examples, the descriptor "first" may be used to refer to an element in the detailed description, while the same element may be referred to in a claim with a different descriptor such as "second" or "third." In such instances, it should be understood that such descriptors are used merely for identifying those elements distinctly within the context of the discussion (e.g., within a claim) in which the elements might, for example, otherwise share a same name.

As used herein, the phrase "in communication," including variations thereof, encompasses direct communication and/or indirect communication through one or more intermediary components, and does not require direct physical (e.g., wired) communication and/or constant communication, but rather additionally includes selective communication at periodic intervals, scheduled intervals, aperiodic intervals, and/or one-time events.

As used herein, "programmable circuitry" is defined to include (i) one or more special purpose electrical circuits (e.g., an application specific circuit (ASIC)) structured to perform specific operation(s) and including one or more semiconductor-based logic devices (e.g., electrical hardware implemented by one or more transistors), and/or (ii) one or more general purpose semiconductor-based electrical circuits programmable with instructions to perform specific functions(s) and/or operation(s) and including one or more semiconductor-based logic devices (e.g., electrical hardware implemented by one or more transistors). Examples of programmable circuitry include programmable microprocessors such as Central Processor Units (CPUs) that may execute first instructions to perform one or more operations and/or functions, Field Programmable Gate Arrays (FPGAs) that may be programmed with second instructions to cause configuration and/or structuring of the FPGAs to instantiate one or more operations and/or functions corresponding to the first instructions, Graphics Processor Units (GPUs) that may execute first instructions to perform one or more operations and/or functions, Digital Signal Processors (DSPs) that may execute first instructions to perform one or more operations and/or functions, XPUs, Network Processing Units (NPUs) one or more microcontrollers that may execute first instructions to perform one or more operations and/or functions and/or integrated circuits such as Application Specific Integrated Circuits (ASICs). For example, an XPU may be implemented by a heterogeneous computing system including multiple types of programmable circuitry (e.g., one or more FPGAs, one or more CPUs, one or more GPUs, one or more NPUs, one or more DSPs, etc., and/or any combination(s) thereof), and orchestration technology (e.g., application programming interface(s) (API(s)) that may assign computing task(s) to whichever one(s) of the multiple types of programmable circuitry is/are suited and available to perform the computing task(s).

As used herein integrated circuit/circuitry is defined as one or more semiconductor packages containing one or more circuit elements such as transistors, capacitors, inductors, resistors, current paths, diodes, etc. For example an integrated circuit may be implemented as one or more of an ASIC, an FPGA, a chip, a microchip, programmable circuitry, a semiconductor substrate coupling multiple circuit elements, a system on chip (SoC), etc.

DETAILED DESCRIPTION

Access to a service or system, such as a bank account, a datastore, etc., can be enabled by voice authentication. For example, a user device can record the speech of a user and transmit the speech to a server associated with the service or system that the user seeks to access. Accordingly, the server can compare voice-specific features of the instant speech to voice-specific features of speech previously associated with the account of the user (e.g., during enrollment) to determine whether the user is authorized to access the account. Thus, when the server determines that the instant voice matches the enrollment voice, the server can provide the user device with access to the requested service or system.

However, voice authentication systems are susceptible to attacks by adverse parties. For instance, the adverse party can access (e.g., record or access a recording of) and replay the voice of the user. Additionally or alternatively, the adverse party can recreate the voice of the user through an Artificial Intelligence (AI) deepfake voice generator. Accordingly, utilization of voice authentication may not be secure against an adverse party with access to the voice of the user. Furthermore, when an adverse party is able to successfully gain admittance into one service or system associated with the user thereby gaining access to the voice of the user, the adverse party is also able to gain access to other services or systems associated with the user that utilize the voice of the user for authentication. Thus, the user may experience a domino effect in that loss of protection for one service or system can lead to loss of protection for other services or systems that utilize the same voice to verify the user. Moreover, the user may be unable to prevent the adverse party from obtaining data that can recreate the voice of the user through their own protection as the adverse party can hack into the server of a system that stores the enrollment voice of the user, and, in turn, the adverse party can utilize the accessed enrollment voice for access to the system itself as well as other systems that utilize the voice of the user for verification. As such, voice authentication systems are susceptible to attack, which deters users and service providers from adopting voice authentication as a security device.

Examples disclosed herein provide methods and apparatus to enable user authentication based on a transformed voice of the user. Advantageously, an adversary who has eavesdropped and captured the user's original voice and/or synthesized a deepfake voice representative of the user's voice will not gain access with the captured voice and/or the synthesized deepfake alone as the adversary does not have a way to recreate the transformed voice. Moreover, the utilization of a transformed voice for user verification enables different voices to be associated with different accounts for the same user. As such, if an adversary accesses the voice used for authentication in one of the user's accounts, the adversary still does not have access to the user's other account(s) as a different transformed voice(s) is associated with the other account(s) for user account protection.

During account enrollment/service registration, a user provides a voice input to be utilized as a baseline for user authentication. Examples disclosed herein adjust the voice input to generate an enrollment voice to associate with the account/service. For example, the voice input can be adjusted based on a target voice associated with the account/service. Specifically, examples disclosed herein generate (e.g., train) a voice transformation model to convert the voice input into the enrollment voice based on the voice input and the target voice. In some examples, the voice transformation model is based on a predetermined adjustment to be made the user's voice input. In such examples, the voice transformation model adjusts the user's voice input based on the predetermined adjustment to generate the enrollment voice. In some examples, the enrollment voice is the target voice. In some examples, the enrollment voice is different from the target voice. In such examples, examples disclosed herein develop the enrollment voice based on the voice transformation model associated with the account, voice-specific features of the target voice, and/or voice-specific features of the voice input. As used herein, the terms "voice-specific features," "voice footprint," and "voice signature" encompass data associated with a speech stream (also referred to herein as a voice signal) that are attributable to a particular voice and differentiate that voice from other voices. For example, the "voice-specific features," the "voice footprint," and the "voice signature" can include mel-frequency cepstral coefficients associated with the voice signal, a pattern in a power and/or frequency spectrum of the voice signal, perceptual linear prediction (PLP) coefficients, i-vectors, x-vectors, and/or any other distinct features of the voice signal that can be utilized to distinguish the voice of a user from voices of other users.

During subsequent account/service access attempts, examples disclosed herein prompt the user to provide another voice input in addition to other login information (e.g., a username, a password, etc.). Examples disclosed herein identify a voice transformation model to be utilized to transform the voice input. For example, the user can provide an input indicative of the particular voice transformation model, or the particular voice transformation model can be associated with the user device and/or account/service information. Examples disclosed herein input the voice input obtained from the user into the identified voice transformation model, which returns a transformed voice (e.g., a transformed voice signal). To determine whether the user attempting to access the account/service is authorized, examples disclosed herein compare a voice signature associated with the transformed voice to a voice signature associated with the enrollment voice.

FIG. 1 is a block diagram of an example user authentication system 100 in which an example user device 110, first example service provider circuitry 120, second example service provider circuitry 121, and an example network 130 operate to enable biometric authentication of a user based on a transformed voice of the user. In FIG. 1, the user device 110 and the service provider circuitry 120, 121 are in communication with (e.g., communicatively coupled via) the network 130.

In the illustrated example of FIG. 1, the network 130 is implemented as a public network, such as the Internet. However, any other type of networks (e.g., wired/cabled, wireless, mobile cellular, etc.) which may be public or private, and any combination thereof may additionally and/or alternatively be used. Additionally, although the example user authentication system 100 utilizes the network 130 for communications between the user device 110 and the service provider circuitry 120, 121, it should be understood that the user device 110 and the service provider circuitry 120, 121 can communicate using any alternative forms of communication to implement the examples disclosed herein.

The user device 110 can be implemented by any personal electronic system, such as a desktop computer, a laptop computer, a tablet, a phone, etc., that can be utilized to communicate with other devices. The service provider circuitry 120, 121 can be implemented by a server or any other type of computing and/or electronic device associated with a service provider, such as a bank, a hospital, a work department, etc. In the illustrated example of FIG. 1, the user device 110 and the service provider circuitry 120, 121 enables a user to sign up for and access an account (e.g., a financial account, a healthcare account, a retail account, etc.) and/or service (e.g., an identification service, a work service, a streaming service, etc.) that the service provider circuitry 120, 121 provides.

For example, the first service provider circuitry 120, 121 can be associated with a first bank (e.g., Citibank), and the second service provider circuitry 120, 121 can be associated with a second bank (e.g., State Bank of India). The user can sign up for a first account with the first bank at the user device 110. Specifically, the user device 110 receives account information (e.g., a username, a password, identification information, etc.) and a speech sample from the user. For example, the user device 110 can prompt the user to read a certain phrase or speak one or more word(s) in their normal voice to enable the user device 110 to capture a speech stream representative of a voice of the user.

In the illustrated example of FIG. 1, the user device 110 or the service provider circuitry 120, 121 identify and/or generate a target voice and/or a voice transformer to be associated with the user account. For example, the voice transformer can adjust the speech stream from the user based on the target voice and/or a predetermined manipulation of the speech stream (e.g., a pole rotation). In some examples, the user device 110 or the service provider circuitry 120, 121 generates the voice transformer based on the speech stream from the user and the target voice. For example, the user device 110 or the service provider circuitry 120, 121 can map first voice-specific characteristics associated with the speech stream from the user to second voice-specific characteristics associated with the target voice to generate the voice transformer. Additionally or alternatively, the user device 110 or the service provider circuitry 120, 121 can train the voice transformer to produce linguistic content (e.g., the specific word(s)) spoken by the user in the target voice. In some examples, the user device 110 or the service provider circuitry 120, 121 produces the target voice based on the predetermined manipulation of the speech stream associated with the voice transformer identified for the account. For example, the user device 110 or the service provider circuitry 120, 121 can identify a particular voice transformer that implements a particular adjustment (e.g., a particular pole rotation) to the speech stream to be associated with the account. In some examples, the user selects an option indicative of a particular target voice or voice transformer during enrollment in the user account. In some examples, the user device 110 or the service provider circuitry 120, 121 determines and assigns the particular target voice or voice transformer to the user account.

In the illustrated example of FIG. 1, a first target voice and/or a first voice transformer are associated with the first account linked to the first service provider circuitry 120, 121. Further, a second target voice and/or a second voice transformer are associated with the second account linked to the second service provider circuitry 120, 121. More particularly, the different target voices and/or voice transformers linked to the different accounts for the same user prevent a security breach associated with one account from impacting another account. For example, if an adverse party accesses the target voice and/or the voice transformer for one account, the other account remains secure. As such, the transformed voice verification provided by the system 100 provides improved security for accounts that utilize voice authentication for user verification. Additionally, the user device 110 and/or the service provider circuitry 120, 121 can embed and identify metadata within the speech stream. As such, the user device 110 and/or the service provider circuitry 120, 121 can convey information between each other within the voice signal as opposed to requiring a separate signal for such information. Thus, the user device 110 and/or the service provider circuitry 120, 121 convey the embedded information using less compute resources (e.g., resources utilized to transmit, receive, store, process, etc.).

Figure 2:
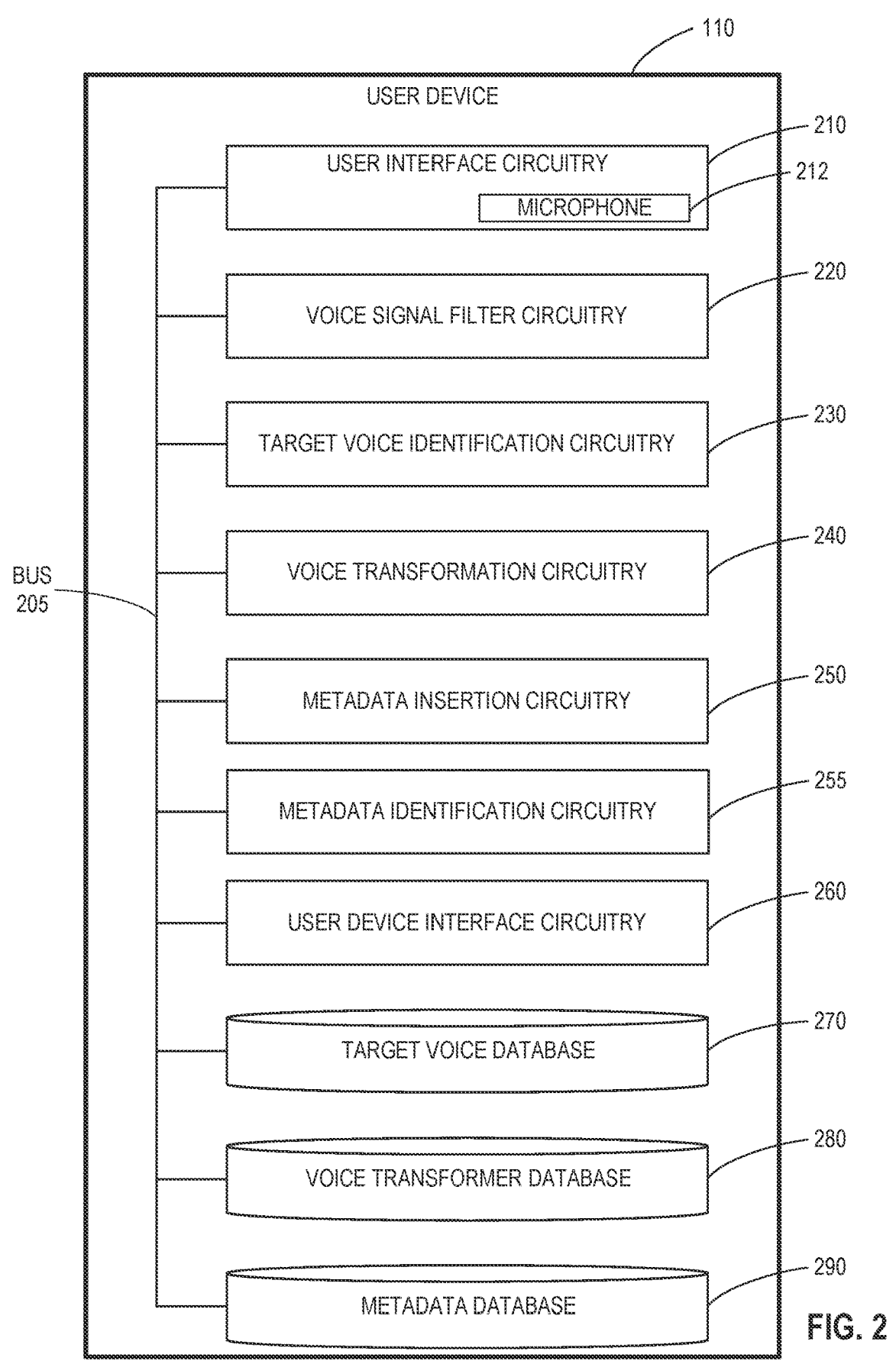
FIG. 2 is a block diagram of an example implementation of the user device of FIG. 1.

FIG. 2 is a block diagram of an example implementation of the user device 110 of FIG. 1 to enable a user to enroll in and access an account and/or service that utilizes a transformed voice for biometric authentication of the user. The user device 110 of FIG. 2 may be instantiated (e.g., creating an instance of, bring into being for any length of time, materialize, implement, etc.) by programmable circuitry such as a Central Processor Unit (CPU) executing first instructions. Additionally or alternatively, the user device 110 of FIG. 2 may be instantiated (e.g., creating an instance of, bring into being for any length of time, materialize, implement, etc.) by (i) an Application Specific Integrated Circuit (ASIC) and/or (ii) a Field Programmable Gate Array (FPGA) structured and/or configured in response to execution of second instructions to perform operations corresponding to the first instructions. It should be understood that some or all of the circuitry of FIG. 2 may, thus, be instantiated at the same or different times. Some or all of the circuitry of FIG. 2 may be instantiated, for example, in one or more threads executing concurrently on hardware and/or in series on hardware. Moreover, in some examples, some or all of the circuitry of FIG. 2 may be implemented by microprocessor circuitry executing instructions and/or FPGA circuitry performing operations to implement one or more virtual machines and/or containers.

In the illustrated example of FIG. 2, the user device 110 includes an example bus 205, example user interface circuitry 210, example voice signal filter circuitry 220, target voice identification circuitry 230, example voice transformation circuitry 240, metadata insertion circuitry 250, example user device interface circuitry 260, an example target voice database 270, an example voice transformer database 280, and an example metadata database 290. Further, the user interface circuitry 210 includes a microphone 212. In the illustrated example of FIG. 2, the user interface circuitry 210, the voice signal filter circuitry 220, the target voice identification circuitry 230, the voice transformation circuitry 240, the metadata insertion circuitry 250, the user device interface circuitry 260, the target voice database 270, the voice transformer database 280, and the metadata database 290 are in communication with the bus 205. In some examples, the bus 205 can be implemented with bus circuitry, bus software, and/or bus firmware. For example, the bus 205 can be implemented by at least one of an Inter-Integrated Circuit (I2C) bus, a Serial Peripheral Interface (SPI) bus, a Peripheral Component Interconnect (PCI) bus, or a Peripheral Component Interconnect Express (PCIe or PCIE) bus. Additionally or alternatively, the bus 205 can be implemented by any other type of computing or electrical bus.

The user device 110 of FIG. 2 includes the user interface circuitry 210 to facilitate communications with a user. For example, the user interface circuitry 210 includes the microphone 212 to receive voice inputs from the user. Additionally, the user interface circuitry 210 can include a speaker, a display screen, a keyboard, a mouse, etc. to receive inputs from and present information to the user. In this example, the user interface circuitry 210 receives inputs from the user indicative of the user requesting to sign up for an account and/or service. Additionally, the user interface circuitry 210 can receive inputs from the user as the user attempts to subsequently access the user-specific account/service. The user interface circuitry 210 can provide the user access to the account/service in response to the access attempt being successful (e.g., when the user is verified). In some examples, a portion of the user interface circuitry 210 is instantiated by programmable circuitry executing user interface instructions and/or configured to perform operations such as those represented by the flowchart(s) of FIGS. 9, 10, and/or 11.

In some examples, the user device 110 includes means for interfacing with a user. For example, the means for interfacing may be implemented by user interface circuitry 210. In some examples, the user interface circuitry 210 may be instantiated by programmable circuitry such as the example programmable circuitry 1312 of FIG. 13. For instance, the user interface circuitry 210 may be instantiated by the example microprocessor 1500 of FIG. 15 executing machine executable instructions such as those implemented by at least blocks 902, 904, 908, 914, 1002, 1004, 1006, 1012, 1014, 1016, 1102 of FIGS. 9, 10, and/or 11. In some examples, the user interface circuitry 210 may be instantiated by hardware logic circuitry, which may be implemented by an ASIC, XPU, or the FPGA circuitry 1600 of FIG. 16 configured and/or structured to perform operations corresponding to the machine readable instructions. Additionally or alternatively, the user interface circuitry 210 may be instantiated by any other combination of hardware, software, and/or firmware. For example, the user interface circuitry 210 may be implemented by at least one or more hardware circuits (e.g., processor circuitry, discrete and/or integrated analog and/or digital circuitry, an FPGA, an ASIC, an XPU, a comparator, an operational-amplifier (op-amp), a logic circuit, etc.) configured and/or structured to execute some or all of the machine readable instructions and/or to perform some or all of the operations corresponding to the machine readable instructions without executing software or firmware, but other structures are likewise appropriate.

The user device 110 of FIG. 2 includes the voice signal filter circuitry 220 to filter the voice inputs that the microphone 212 receives from the user. For example, the voice signal filter circuitry 220 can filter the voice signal generated by the microphone 212 to remove background noise (e.g., from a television, a speaker, a ceiling fan, etc.) that is separate from the voice input provided by the user. In some examples, to filter the voice input, the voice signal filter circuitry 220 applies a high-pass filter and/or a low-pass filter to the voice signal. Accordingly, the voice signal filter circuitry 220 can generate a filtered voice signal. In some examples, the voice signal filter circuitry 220 is incorporated in the microphone 212. In some examples, the voice signal filter circuitry 220 is instantiated by programmable circuitry executing voice signal filter instructions and/or configured to perform operations such as those represented by the flowchart of FIG. 9.

In some examples, the user device 110 includes means for filtering a voice signal. For example, the means for filtering may be implemented by voice signal filter circuitry 220. In some examples, the voice signal filter circuitry 220 may be instantiated by programmable circuitry such as the example programmable circuitry 1312 of FIG. 13. For instance, the voice signal filter circuitry 220 may be instantiated by the example microprocessor 1500 of FIG. 15 executing machine executable instructions such as those implemented by at least block 906 of FIG. 9. In some examples, the voice signal filter circuitry 220 may be instantiated by hardware logic circuitry, which may be implemented by an ASIC, XPU, or the FPGA circuitry 1600 of FIG. 16 configured and/or structured to perform operations corresponding to the machine readable instructions. Additionally or alternatively, the voice signal filter circuitry 220 may be instantiated by any other combination of hardware, software, and/or firmware. For example, the voice signal filter circuitry 220 may be implemented by at least one or more hardware circuits (e.g., processor circuitry, discrete and/or integrated analog and/or digital circuitry, an FPGA, an ASIC, an XPU, a comparator, an operational-amplifier (op-amp), a logic circuit, etc.) configured and/or structured to execute some or all of the machine readable instructions and/or to perform some or all of the operations corresponding to the machine readable instructions without executing software or firmware, but other structures are likewise appropriate.

The user device 110 of FIG. 2 includes the target voice identification circuitry 230 to determine a target voice to associate with a user-specific account and/or service for which the user is signing up (e.g., enrolling, registering, subscribing, etc.). In some examples, the target voice identification circuitry 230 causes the user interface circuitry 210 to prompt the user to select a target voice. For example, the user interface circuitry 210 can present a list of available target voices via a dropdown menu. In such examples, the target voice identification circuitry 230 identifies the target voice based on an option in the dropdown menu selected by the user. In some examples, the target voice identification circuitry 230 determines the target voice without a user input. For example, the target voice identification circuitry 230 can determine the target voice based on information associated with the user device 110 (e.g., a device footprint, a media access control (MAC) address of the user device 110, an International Mobile Equipment Identity (IMEI) of the user device 110, etc.), information associated with the respective service provider circuitry 120, 121 that provides the user-specific account and/or service (e.g., a serial number of the respective service provider circuitry 120, 121, a type of service/account for which the user is signing up, etc.), and/or information that the user provides for the enrollment (e.g., a username, a password, an address, etc.). In some examples, the target voice identification circuitry 230 identifies a pool of available target voices (e.g., target voices not yet assigned to a user account) via the target voice database 270. For example, the target voices stored in the target voice database 270 can be crowd sourced, synthetically generated, etc. As such, the target voice identification circuitry 230 can select a target voice for the account/service for which the user is signing up from the target voice database 270.

In some examples, the service provider circuitry 120, 121 transmits the target voice database 270, or a particular target voice, to the user device 110 in response to receiving an enrollment request from the user device 110. In some such examples, the first service provider circuitry 120, 121 communicates with the second service provider circuitry 120, 121 to ensure that assigned target voices are removed from the pool in the target voice database 270. In some examples, one or more third party devices build and maintain the target voice database 270. In such examples, user devices (e.g., the user device 110) and service providers (e.g., the first service provider circuitry 120, the second service provider circuitry 121) communicate with the third party devices to obtain a target voice to associate with a user-specific account/service during registration and update the target voice database 270 when target voices are assigned.

In some examples, the target voice identification circuitry 230 identifies target voices associated with other accounts and/or services that the user has accessed on the user device 110. In such examples, the target voice identification circuitry 230 removes the identified target voices from the pool such that the target voices associated with the user for another account/service are not associated with the user again. As a result, the target voice identification circuitry 230 causes each target voice associated with the user accounts/services to be unique to prevent a breach of a target voice for one user account/service from affecting the security of other user accounts/services.

In some examples, at least a portion of the target voice identification circuitry 230 is implemented by the service provider circuitry 120, 121. For example, the service provider circuitry 120, 121 can include the target voice identification circuitry 230 instead of the user device 110, as discussed further in association with FIG. 3. In some examples, the target voice identification circuitry 230 is instantiated by programmable circuitry executing transformation identification instructions and/or configured to perform operations such as those represented by the flowchart of FIG. 9.

The user device 110 of FIG. 2 includes the voice transformation circuitry 240 to generate a voice transformer based on the filtered voice signal (e.g., that the microphone 212 and the voice signal filter circuitry 220 generate) and the identified target voice (e.g., that the target voice identification circuitry 230 provides). In some examples, the voice transformation circuitry 240 develops and trains the voice transformer as a machine learning model (e.g., a voice transformation model) to adjust the filtered voice signal based on the identified target voice. For example, the voice transformation circuitry 240 can implement the voice transformer as a bi-directional long short-term memory (Bi- LSTM), a pole shifting model, and/or a one-shot voice conversion variational autoencoder, as discussed in further detail below.

In some examples, the voice transformation circuitry 240 identifies first voice-specific features associated with the filtered voice signal. Similarly, the voice transformation circuitry 240 can identify second voice-specific features associated with the identified target voice. For example, the voice transformation circuitry 240 can identify a first mel-frequency cepstrum (e.g., first mel-frequency cepstral coefficients) associated with the filtered voice signal and a second mel-frequency cepstrum (e.g., second mel-frequency cepstral coefficients) associated with the identified target voice.

The voice transformation circuitry 240 can train the voice transformer to adjust the first voice-specific features of the filtered voice signal based on the second voice-specific features of the target voice. In some examples, the voice transformation circuitry 240 causes the voice transformer to develop a map and/or a function(s) corresponding to the differences between the first voice-specific features and the second voice-specific features during training. In such examples, the voice transformation circuitry 240 trains the voice transformer to learn adjustments to the filtered voice signal that cause the filtered voice signal to match the target voice. In such examples, the target voice serves as an enrollment voice for the user account/service. In some examples, the voice transformation circuitry 240 uses the differences between the first voice-specific features and the second voice-specific features as a baseline for production of another voice or voice signal to be associated with the user account/service. In such examples, the produced voice signal serves as the enrollment voice for the user account/service. As used herein, an "enrollment voice" is a voice or voice signal that is utilized as a baseline for biometric authentication of a voice associated with an access attempt for a user-specific account/service.

In the illustrated example of FIG. 2, the voice transformation circuitry 240 links the enrollment voice with other enrollment information associated with the account/service for which the user is signing up. For example, the voice transformation circuitry 240 can cause the user device interface circuitry 260 to transmit the enrollment voice and the other enrollment information to the service provider circuitry 120, 121. In turn, the service provider circuitry 120, 121 can create an account for the user and associate the enrollment voice and the other enrollment information with the account. Accordingly, the service provider circuitry 120, 121 can use the enrollment voice and/or the other enrollment information for verification of the user in response to receiving a subsequent request to access the account, as discussed further in association with FIG. 3. Additionally, the voice transformation circuitry 240 associates the trained voice transformer with the new account information and/or information associated with the service provider circuitry 120. The voice transformation circuitry 240 can store the associated voice transformer, account information, and/or information associated with the respective service provider circuitry 120, 121 via the voice transformer database 280. In some examples, the voice transformation circuitry 240 stores the voice transformer with an identification value. In such examples, the voice transformation circuitry 240 causes the user interface circuitry 210 to instruct the user to recall the identification value of the voice transformer for subsequent attempts to access the account.

Additionally, the user device 110 of FIG. 2 includes the voice transformation circuitry 240 to identify the voice transformer generated for the user-specific account/service when the user device 110 requests access to the account/service after registration. For example, the voice transformation circuitry 240 can access the associated voice transformer, account information, information associated with the service provider circuitry 120, 121, and/or the identification value of the voice transformer via the voice transformer database 280 in response to user interface circuitry 210 receiving an input indicative of an attempt to access the account/service. More particularly, when the user interface circuitry 210 encounters a login attempt at a webpage associated with the service provider circuitry 120, 121 that uses the account information and/or provides the identification value of the voice transformer, the voice transformation circuitry 240 can identify the voice transformer to be applied to a voice input that the microphone 212 receives from the user in association with the access attempt. Further, after the voice signal filter circuitry 220 filters the captured voice input, the voice transformation circuitry 240 can transform the voice input using the voice transformer. That is, the voice transformation circuitry 240 can input the voice input into the voice transformer, which outputs a transformed voice based on the target voice.

In some examples, at least a portion of the voice transformation circuitry 240 is implemented by the service provider circuitry 120, 121. For example, the service provider circuitry 120, 121 can include the voice transformation circuitry 240 instead of the user device 110, as discussed further in association with FIG. 3. In some examples, the voice transformation circuitry 240 is instantiated by programmable circuitry executing voice transformation instructions and/or configured to perform operations such as those represented by the flowchart(s) of FIGS. 9 and/or 10.

The user device 110 of FIG. 2 includes the metadata insertion circuitry 250 to insert metadata into a voice signal to convey information. For example, the metadata insertion circuitry 250 can access a voice signal that the microphone 212 records and the voice signal filter circuitry 220 filters. The metadata insertion circuitry 250 identifies least significant bits in the voice signal. More particularly, the least significant bits in the voice signal are bits that can be altered without impacting linguistic content (e.g., spoken words) conveyed by the voice signal.

In some examples, the metadata is representative of a copyright mark. In some such examples, external systems can identify the copyright mark communicated by the metadata in the voice signal and recognize that the external system is not authorized to present the voice signal. Thus, the metadata insertion circuitry 250 provides a safeguard against unauthorized usage of the voice signal to preserve the integrity of copyrighted content. In some examples, the metadata can provide information that enables the sound conveyed by the signal to be improved. For example, the metadata insertion circuitry 250 can utilize noise modeling techniques to estimate noise parameters in the voice signal. In some examples, the metadata provides information associated with a relationship between speech parameters and the noise parameters in the voice signal. For example, the metadata insertion circuitry 250 can utilize a neural network to predict the speech parameters and the noise parameters. Further, the metadata insertion circuitry 250 can set the metadata (e.g., set the bit values) to be indicative of the noise parameters. In some examples, the metadata is representative of information associated with the user device 110. For example, the metadata can indicate an IMEI of the user device 110, a MAC address of the user device 110, etc. As such, the service provider circuitry 120, 121 can identify account access attempts from new devices and prompt another user device (e.g., a primary user device) to indicate whether the access attempt is authorized. In some examples, the metadata is representative of a location of the user device 110. Accordingly, the service provider circuitry 120, 121 can detect an unusual location associated with a login attempt and prompt the primary user device to indicate whether the attempt is authorized. By embedding the metadata in the voice signal as opposed to utilized a separate signal to convey such information, the metadata insertion circuitry 250 reduces compute resources utilized to generate, transmit, receive, process, and/or store the information and the voice signal. The metadata database 290 can store data that links metadata values (e.g., values of bits in a string) to information that the metadata represents.

In some examples, the metadata insertion circuitry 250 identifies the least significant bits based on an original voice signal recorded by the microphone 212 and a filtered voice signal that the voice signal filter circuitry 220 outputs. For example, the metadata insertion circuitry 250 can identify a string of bits that the voice signal filter circuitry 220 adjusted and, thus, determine that the string of bits does not convey linguistic content. In some examples, the metadata insertion circuitry 250 identifies a predetermined location associated with the least significant bits based on a type of recorded voice signal. For example, the metadata insertion circuitry 250 can determine that a first or last string of bits typically does not convey speech in a certain application such that the first or last string of bits can be overwritten without impacting the content of the voice signal. In some examples, the metadata insertion circuitry 250 analyzes the voice signal to identify a period of silence. In such examples, the metadata insertion circuitry 250 can insert the metadata in the string of bits associated with the period of silence. Additionally, in such examples, the metadata includes one or more signatures (e.g., a signature indicative of beginning of the metadata, a signature indicative of an end of the metadata, etc.) to enable the service provider circuitry 120, 121 to identify the location of the metadata in the voice signal. The metadata database 290 can store data indicative of the predetermined metadata location, metadata values indicative of a certain metadata location, and/or metadata signature. In some examples, the service provider circuitry 120, 121 includes the metadata insertion circuitry 250 in addition to or instead of the user device 110, as discussed in association with FIG. 3. In some examples, metadata insertion circuitry 250 is instantiated by programmable circuitry executing metadata insertion instructions and/or configured to perform operations such as those represented by the flowchart of FIG. 11.

The user device 110 of FIG. 2 includes the metadata identification circuitry 255 to identify metadata embedded in a voice signal that the user device 110 receives. For example, the user device 110 can receive the voice signal with the embedded metadata from another user device and/or the service provider circuitry 120, 121. In some examples, the metadata identification circuitry 255 identifies a location of the metadata within the voice signal and/or information represented by the metadata based on data stored in the metadata database 290. For example, the metadata identification circuitry 255 can identify a predetermined location of the metadata and/or values of a string of bits representative of a beginning of the metadata, an end of the metadata, and/or a location of the metadata within the voice signal.

In the illustrated examples, the metadata identification circuitry 255 identifies the information conveyed by the metadata. For example, the metadata identification circuitry 255 can determine that the metadata is indicative of a copyright mark and, thus, that the user device 110 is not authorized to present, modify, or maintain the voice signal. In some examples, the metadata identification circuitry 255 identifies noise parameters associated with the voice signal based on the identified metadata. In some examples, the metadata identification circuitry 255 identifies a source of the voice signal based on the identified metadata. In some examples, the metadata identification circuitry 255 identifies a location of the source based on the metadata.

In the illustrated examples, the metadata identification circuitry 255 causes an action to be performed based on the identified information conveyed by the metadata. For example, the metadata identification circuitry 255 can prevent the voice signal from being presented and/or discard the voice signal in response to identifying the copyright mark. The metadata identification circuitry 255 can adjust the voice signal based on the noise parameters indicated by the metadata. The metadata identification circuitry 255 can determine an authenticity of the voice signal based on the source and/or the location of the source.

Figure 3:
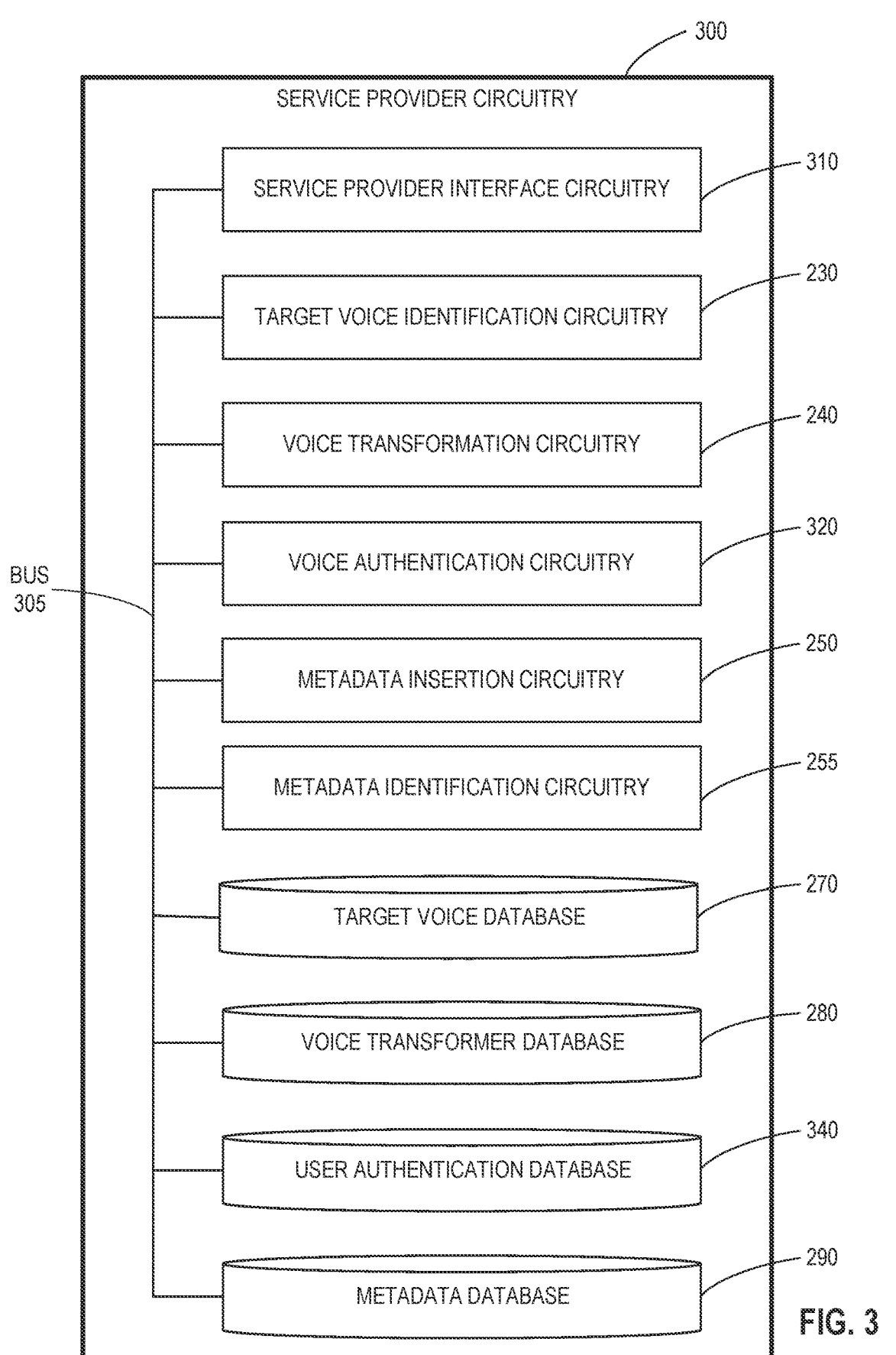
FIG. 3 is a block diagram of an example implementation of the service provider circuitry of FIG. 1.

In some examples, the service provider circuitry 120, 121 includes the metadata identification circuitry 255 in addition to or instead of the user device 110, as discussed in association with FIG. 3. In some examples, metadata identification circuitry 255 is instantiated by programmable circuitry executing metadata insertion instructions and/or configured to perform operations such as those represented by the flowchart of FIG. 12.

The user device 110 of FIG. 2 includes the user device interface circuitry 260 to facilitate communications with the service provider circuitry 120, 121. For example, the user device interface circuitry 260 can be implemented by a communication device such as a transmitter, a receiver, a transceiver, a residential gateway, a wireless access point, and/or a network interface to facilitate exchange of data with the service provider circuitry 120, 121 via the network 130. The user device interface circuitry 260 can transmit an unfiltered voice signal, a filtered voice signal, a target voice, a voice transformer, an enrollment voice, a transformed voice, a voice signal with embedded metadata, and/or user account information. Additionally, the user device interface circuitry 260 can receive a target voice, a voice transformer, a voice signal with embedded metadata, and/or user account information. In some examples, the user device interface circuitry 260 is instantiated by programmable circuitry executing service provider interface instructions and/or configured to perform operations such as those represented by the flowchart(s) of FIGS. 9, 10, and/or 11.

In some examples, the user device 110 includes means for communicating with the service provider circuitry 120, 121. For example, the means for communicating may be implemented by user device interface circuitry 260. In some examples, the user device interface circuitry 260 may be instantiated by programmable circuitry such as the example programmable circuitry 1312 of FIG. 13. For instance, the user device interface circuitry 260 may be instantiated by the example microprocessor 1500 of FIG. 15 executing machine executable instructions such as those implemented by at least blocks 902, 904, 908, 912, 914, 1002, 1004, 1006, 1010, 1012, 1014, 1016, 1108, 1202 of FIGS. 9, 10, 11, and/or 12. In some examples, the user device interface circuitry 260 may be instantiated by hardware logic circuitry, which may be implemented by an ASIC, XPU, or the FPGA circuitry 1600 of FIG. 16 configured and/or structured to perform operations corresponding to the machine readable instructions. Additionally or alternatively, the user device interface circuitry 260 may be instantiated by any other combination of hardware, software, and/or firmware. For example, the user device interface circuitry 260 may be implemented by at least one or more hardware circuits (e.g., processor circuitry, discrete and/or integrated analog and/or digital circuitry, an FPGA, an ASIC, an XPU, a comparator, an operational-amplifier (op-amp), a logic circuit, etc.) configured and/or structured to execute some or all of the machine readable instructions and/or to perform some or all of the operations corresponding to the machine readable instructions without executing software or firmware, but other structures are likewise appropriate.

FIG. 3 is a block diagram of example service provider circuitry 300 representative of an example implementation of the first service provider circuitry 120 and the second service provider circuitry 121 of FIG. 1 to enable a user to sign up for and access an account and/or service that utilizes a transformed voice for biometric authentication of the user. The service provider circuitry 300 of FIG. 3 may be instantiated (e.g., creating an instance of, bring into being for any length of time, materialize, implement, etc.) by programmable circuitry such as a Central Processor Unit (CPU) executing first instructions. Additionally or alternatively, the service provider circuitry 300 of FIG. 3 may be instantiated (e.g., creating an instance of, bring into being for any length of time, materialize, implement, etc.) by (i) an Application Specific Integrated Circuit (ASIC) and/or (ii) a Field Programmable Gate Array (FPGA) structured and/or configured in response to execution of second instructions to perform operations corresponding to the first instructions. It should be understood that some or all of the circuitry of FIG. 3 may, thus, be instantiated at the same or different times. Some or all of the circuitry of FIG. 3 may be instantiated, for example, in one or more threads executing concurrently on hardware and/or in series on hardware. Moreover, in some examples, some or all of the circuitry of FIG. 3 may be implemented by microprocessor circuitry executing instructions and/or FPGA circuitry performing operations to implement one or more virtual machines and/or containers.

In the illustrated example of FIG. 3, the service provider circuitry 300 includes an example bus 305, example service provider interface circuitry 310, the example target voice identification circuitry 230, the example voice transformation circuitry 240, example voice authentication circuitry 320, the example metadata insertion circuitry 250, the example metadata identification circuitry 255, the example target voice database 270, the example voice transformer database 280, an example user authentication database 340, and the example metadata database 290. In the illustrated example of FIG. 2, the service provider interface circuitry 310, the target voice identification circuitry 230, the voice transformation circuitry 240, the voice authentication circuitry 320, the metadata insertion circuitry 250, the metadata identification circuitry 255, the target voice database 270, the voice transformer database 280, the user authentication database 340, and the metadata database 290 are in communication with the bus 305. In some examples, the bus 305 can be implemented with bus circuitry, bus software, and/or bus firmware. For example, the bus 305 can be implemented by at least one of an I2C bus, a SPI bus, a PCI bus, or a PCIe or PCIE bus. Additionally or alternatively, the bus 205 can be implemented by any other type of computing or electrical bus.

The service provider circuitry 300 of FIG. 3 includes the service provider interface circuitry 310 to facilitate communications with the user device 110 and/or other service providers (e.g., between the first service provider circuitry 120 and the second service provider circuitry 121) via the network 130. The service provider interface circuitry 310 can receive unfiltered voice signals, filtered voice signals, target voices, voice transformers, enrollment voices, transformed voices, voice signals with embedded metadata, and/ or user account information. Additionally, the interface circuitry can transmit target voices, voice transformers, voice signals with embedded metadata, and/or user account information. In the illustrated example of FIG. 3, the service provider interface circuitry 310 can be representative of and/or otherwise implement one or more interfaces. For example, the service provider interface circuitry 310 can be implemented by a communication device (e.g., a network interface card (NIC), a smart NIC, an Infrastructure Processing Unit (IPU), etc.) such as a transmitter, a receiver, a transceiver, a modem, a residential gateway, a wireless access point, and/or a network interface to facilitate exchange of data with the user device 110 and other service provider circuitry 300 via the network 130. In some examples, the communication is effectuated via an Ethernet connection, a digital subscriber line (DSL) connection, a telephone line connection, a coaxial cable system, a satellite system, a beyond line-of-site wireless system, a line-of-site wireless system, a cellular telephone system, etc. For example, the service provider interface circuitry 310 can be implemented by any type of interface standard, such as a Wi-Fi interface and/or an Ethernet interface. In some examples, the service provider interface circuitry 310 is instantiated by programmable circuitry executing interface instructions and/or configured to perform operations such as those represented by the flowchart(s) of FIGS. 9, 10, 11, and/or 12.

In some examples, the service provider circuitry 300 includes means for communicating with the user device 110 and/or other ones of the service provider circuitry 300. For example, the means for communicating may be implemented by service provider interface circuitry 310. In some examples, the service provider interface circuitry 310 may be instantiated by programmable circuitry such as the example programmable circuitry 1412 of FIG. 14. For instance, the service provider interface circuitry 310 may be instantiated by the example microprocessor 1500 of FIG. 15 executing machine executable instructions such as those implemented by at least blocks 902, 904, 908, 912, 914, 1002, 1004, 1006, 1010, 1012, 1014, 1016, 1108, 1202 of FIGS. 9, 10, 11, and/or 12. In some examples, the service provider interface circuitry 310 may be instantiated by hardware logic circuitry, which may be implemented by an ASIC, XPU, or the FPGA circuitry 1600 of FIG. 16 configured and/or structured to perform operations corresponding to the machine readable instructions. Additionally or alternatively, the service provider interface circuitry 310 may be instantiated by any other combination of hardware, software, and/or firmware. For example, the service provider interface circuitry 310 may be implemented by at least one or more hardware circuits (e.g., processor circuitry, discrete and/or integrated analog and/or digital circuitry, an FPGA, an ASIC, an XPU, a comparator, an operational-amplifier (op-amp), a logic circuit, etc.) configured and/or structured to execute some or all of the machine readable instructions and/or to perform some or all of the operations corresponding to the machine readable instructions without executing software or firmware, but other structures are likewise appropriate.

The service provider circuitry 300 of FIG. 3 includes the target voice identification circuitry 230 to determine a target voice to associate with a user-specific account and/or service for which the user is signing up (e.g., enrolling, registering, subscribing, etc.), as discussed in association with FIG. 2. For example, after the service provider interface circuitry 310 receives a sign up request for a new account from the user device 110 via the network 130, the target voice identification circuitry 230 can determine a target voice to utilize for development of a voice transformer for the account. In some examples, the target voice identification circuitry 230 determines the target voice based on an input from the user received at the user interface circuitry 210 of the user device 110. In some examples, the target voice identification circuitry 230 selects the target voice from the target voice database 270 based on the information associated with the user device 110, a type of service provided by the service provider circuitry 300, and/or the information that the user provides for the enrollment. Further, the target voice identification circuitry 230 can transmit a signal indicative of the target voice to the voice transformation circuitry 240. In some examples, the user device 110 includes the target voice identification circuitry 230 instead of the service provider circuitry 300, as discussed in association with FIG. 2.

In some examples, the user device 110 and/or the service provider circuitry 300 include means for identifying a target voice. For example, the means for identifying may be implemented by the target voice identification circuitry 230. In some examples, the target voice identification circuitry 230 may be instantiated by programmable circuitry such as the example programmable circuitry 1312, 1412 of FIGS. 13 and/or 14. For instance, the target voice identification circuitry 230 may be instantiated by the example microprocessor 1500 of FIG. 15 executing machine executable instructions such as those implemented by at least block 908 of FIG. 9. In some examples, the target voice identification circuitry 230 may be instantiated by hardware logic circuitry, which may be implemented by an ASIC, XPU, or the FPGA circuitry 1600 of FIG. 16 configured and/or structured to perform operations corresponding to the machine readable instructions. Additionally or alternatively, the target voice identification circuitry 230 may be instantiated by any other combination of hardware, software, and/or firmware. For example, the target voice identification circuitry 230 may be implemented by at least one or more hardware circuits (e.g., processor circuitry, discrete and/or integrated analog and/or digital circuitry, an FPGA, an ASIC, an XPU, a comparator, an operational-amplifier (op-amp), a logic circuit, etc.) configured and/or structured to execute some or all of the machine readable instructions and/or to perform some or all of the operations corresponding to the machine readable instructions without executing software or firmware, but other structures are likewise appropriate.

The service provider circuitry 300 of FIG. 3 includes the voice transformation circuitry 240 to generate a voice transformer based on the voice input from the user (e.g., that the microphone 212 and the voice signal filter circuitry 220 generate) and the identified target voice (e.g., that the target voice identification circuitry 230 provides), as discussed in association with FIG. 2. Additionally, the service provider circuitry 300 of FIG. 3 includes the voice transformation circuitry 240 to identify the voice transformer generated for the user-specific account/service when the user device 110 requests access to the account/service after registration, as discussed in association with FIG. 2. Further, the service provider circuitry 300 of FIG. 3 includes the voice transformation circuitry 240 to transform the voice input provided by the user to generate the enrollment voice during registration and a transformed voice during subsequent account access attempts, as discussed in association with FIG. 2. In some examples, the voice transformation circuitry 240 stores the enrollment voice for the account in the user authentication database 340 with other information associated with the account (e.g., a username, a password, etc.) for later retrieval during account access attempts. In some examples, the user device 110 includes the voice transformation circuitry 240 instead of the service provider circuitry 300, as discussed in association with FIG. 2. When the user device 110 includes the voice transformation circuitry 240 instead of the service provider circuitry 300, the service provider interface circuitry 310 stores the enrollment voice for the account in the user authentication database 340 with the other information associated with the account in response to receiving the enrollment voice and the other account information from the user device 110 via the network 130.

In some examples, the user device 110 and/or the service provider circuitry 300 include means for transforming a voice signal. For example, the means for transforming may be implemented by voice transformation circuitry 240. In some examples, the voice transformation circuitry 240 may be instantiated by programmable circuitry such as the example programmable circuitry 1312, 1412 of FIGS. 13 and/or 14. For instance, the voice transformation circuitry 240 may be instantiated by the example microprocessor 1500 of FIG. 15 executing machine executable instructions such as those implemented by at least blocks 910, 912, 1006, 1008 of FIGS. 9 and/or 10. In some examples, the voice transformation circuitry 240 may be instantiated by hardware logic circuitry, which may be implemented by an ASIC, XPU, or the FPGA circuitry 1600 of FIG. 16 configured and/or structured to perform operations corresponding to the machine readable instructions. Additionally or alternatively, the voice transformation circuitry 240 may be instantiated by any other combination of hardware, software, and/or firmware. For example, the voice transformation circuitry 240 may be implemented by at least one or more hardware circuits (e.g., processor circuitry, discrete and/or integrated analog and/or digital circuitry, an FPGA, an ASIC, an XPU, a comparator, an operational-amplifier (op-amp), a logic circuit, etc.) configured and/or structured to execute some or all of the machine readable instructions and/or to perform some or all of the operations corresponding to the machine readable instructions without executing software or firmware, but other structures are likewise appropriate. In some examples, the means for transforming includes means for training a voice transformer. In some examples, the means for transforming includes means for identifying a voice transformer.

The service provider circuitry 300 of FIG. 3 includes the voice authentication circuitry 320 to determine whether a user is authorized to access the user-specific account based on the enrollment voice associated with the account and the transformed voice generated by the voice transformation circuitry 240 for the account access attempt. For example, the voice authentication circuitry 320 can determine whether the transformed voice matches the enrollment voice for the account to which the user device 110 requests access. The voice authentication circuitry 320 can identify the enrollment voice associated with the account via the user authentication database 340 based on other account information provided in association with the access attempt. Further, the voice authentication circuitry 320 can compare voice-specific features of the transformed voice to voice-specific features of the enrollment voice associated with the account/service subscription to determine whether the transformed voice is a product of a voice input from the same user that enrolled the account and a voice transformer that produced the enrollment voice. In some examples, the voice authentication circuitry 320 compares first mel-frequency cepstral coefficients of the transformed voice to second mel-frequency cepstral coefficients of the enrollment voice. In such examples, the voice authentication circuitry 320 determines that the transformed voice matches the enrollment voice when the first mel-frequency cepstral coefficients approximately match (e.g., within 2%) respective ones of the second mel-frequency cepstral coefficients. In some examples, the voice authentication circuitry 320 determines a cosine similarity between the transformed voice signature and the enrollment voice signature. In such examples, the voice authentication circuitry 320 determines the transformed voice matches the enrollment voice when the cosine similarity satisfies a threshold (e.g., 0.9 with a standard deviation of 0.5, 0.95 with a standard deviation of 0.25). When the voice authentication circuitry 320 determines that the voice-specific features of the transformed voice approximately match the voice-specific features of the enrollment voice, the voice authentication circuitry 320 determines that the user requesting access to the account is verified and, in turn, causes the service provider interface circuitry 310 to provide the requested access to the user device 110. Otherwise, when the voice authentication circuitry 320 determines that the voice-specific features of the transformed voice are not an approximate match with the voice-specific features of the enrollment voice, the voice authentication circuitry 320 determines that the user requesting access to the account is not verified and, in turn, causes the service provider interface circuitry 310 to deny the user device 110 access to the account. In some examples, the voice authentication circuitry 320 is instantiated by programmable circuitry executing voice authentication instructions and/or configured to perform operations such as those represented by the flowchart of FIG. 10.

In some examples, the service provider circuitry 300 includes means for authenticating a user. For example, the means for authenticating may be implemented by voice authentication circuitry 320. In some examples, the voice authentication circuitry 320 may be instantiated by programmable circuitry such as the example programmable circuitry 1312, 1412 of FIGS. 13 and/or 14. For instance, the voice authentication circuitry 320 may be instantiated by the example microprocessor 1500 of FIG. 15 executing machine executable instructions such as those implemented by at least blocks 1010, 1012, 1014 of FIG. 10. In some examples, the voice authentication circuitry 320 may be instantiated by hardware logic circuitry, which may be implemented by an ASIC, XPU, or the FPGA circuitry 1600 of FIG. 16 configured and/or structured to perform operations corresponding to the machine readable instructions. Additionally or alternatively, the voice authentication circuitry 320 may be instantiated by any other combination of hardware, software, and/or firmware. For example, the voice authentication circuitry 320 may be implemented by at least one or more hardware circuits (e.g., processor circuitry, discrete and/or integrated analog and/or digital circuitry, an FPGA, an ASIC, an XPU, a comparator, an operational-amplifier (op-amp), a logic circuit, etc.) configured and/or structured to execute some or all of the machine readable instructions and/or to perform some or all of the operations corresponding to the machine readable instructions without executing software or firmware, but other structures are likewise appropriate. In some examples, the means for authenticating includes means for identifying voice-specific features of a voice signal. In some examples, the means for authenticating includes means for comparing voice-specific features of voice signals.

The service provider circuitry 300 of FIG. 3 includes the metadata insertion circuitry 250 to insert metadata into a voice signal to convey information, as discussed in association with FIG. 2. In some examples, the metadata insertion circuitry 250 inserts metadata within the least significant bits of the enrollment voice signals. In such examples, the metadata can indicate that the voice signal is not to be accessed or presented by another device, similar to a copyright mark. As such, the metadata insertion circuitry 250 can prevent adverse parties from using the enrollment voice signals if accessed. In some examples, the user device 110 includes the metadata insertion circuitry 250 in addition to or instead of the service provider circuitry 300, as discussed in association with FIG. 2.

In some examples, the user device 110 and/or the service provider circuitry 300 include means for embedding metadata in a voice signal. For example, the means for embedding may be implemented by metadata insertion circuitry 250. In some examples, the metadata insertion circuitry 250 may be instantiated by programmable circuitry such as the example programmable circuitry 1312, 1412 of FIGS. 13 and/or 14. For instance, the metadata insertion circuitry 250 may be instantiated by the example microprocessor 1500 of FIG. 15 executing machine executable instructions such as those implemented by at least blocks 1104, 1106 of FIG. 11. In some examples, the metadata insertion circuitry 250 may be instantiated by hardware logic circuitry, which may be implemented by an ASIC, XPU, or the FPGA circuitry 1600 of FIG. 16 configured and/or structured to perform operations corresponding to the machine readable instructions. Additionally or alternatively, the metadata insertion circuitry 250 may be instantiated by any other combination of hardware, software, and/or firmware. For example, the metadata insertion circuitry 250 may be implemented by at least one or more hardware circuits (e.g., processor circuitry, discrete and/or integrated analog and/or digital circuitry, an FPGA, an ASIC, an XPU, a comparator, an operational-amplifier (op-amp), a logic circuit, etc.) configured and/or structured to execute some or all of the machine readable instructions and/or to perform some or all of the operations corresponding to the machine readable instructions without executing software or firmware, but other structures are likewise appropriate.

The service provider circuitry 300 of FIG. 3 includes the metadata identification circuitry 255 to identify metadata embedded in a voice signal that the service provider interface circuitry 310 receives from the user device 110, as discussed in association with FIG. 2. In some examples, the metadata identification circuitry 255 identifies a location of the metadata within the voice signal and/or information represented by the metadata based on data stored in the metadata database 290, as discussed in association with FIG. 2. Further, metadata identification circuitry 255 causes an action to be performed based on the identified information conveyed by the metadata, as discussed in association with FIG. 2. In some examples, the user device 110 includes the metadata identification circuitry 255 in addition to or instead of the service provider circuitry 300.

In some examples, the user device 110 and/or the service provider circuitry 300 includes means for analyzing embedded metadata in a voice signal. For example, the means for analyzing may be implemented by metadata identification circuitry 255. In some examples, the metadata identification circuitry 255 may be instantiated by programmable circuitry such as the example programmable circuitry 1312, 1412 of FIGS. 13 and/or 14. For instance, the metadata identification circuitry 255 may be instantiated by the example microprocessor 1500 of FIG. 15 executing machine executable instructions such as those implemented by at least blocks 1202, 1204, 1206, 1208 of FIG. 12. In some examples, the metadata identification circuitry 255 may be instantiated by hardware logic circuitry, which may be implemented by an ASIC, XPU, or the FPGA circuitry 1600 of FIG. 16 configured and/or structured to perform operations corresponding to the machine readable instructions. Additionally or alternatively, the metadata identification circuitry 255 may be instantiated by any other combination of hardware, software, and/or firmware. For example, the metadata identification circuitry 255 may be implemented by at least one or more hardware circuits (e.g., processor circuitry, discrete and/or integrated analog and/or digital circuitry, an FPGA, an ASIC, an XPU, a comparator, an operational-amplifier (op-amp), a logic circuit, etc.) configured and/or structured to execute some or all of the machine readable instructions and/or to perform some or all of the operations corresponding to the machine readable instructions without executing software or firmware, but other structures are likewise appropriate. In some examples, the means for analyzing includes means for identifying a location of the metadata. In some examples, the means for analyzing includes means for determining information associated with the metadata. In some examples, the means for analyzing includes means for causing an action to be performed based on the metadata.

Figure 4:
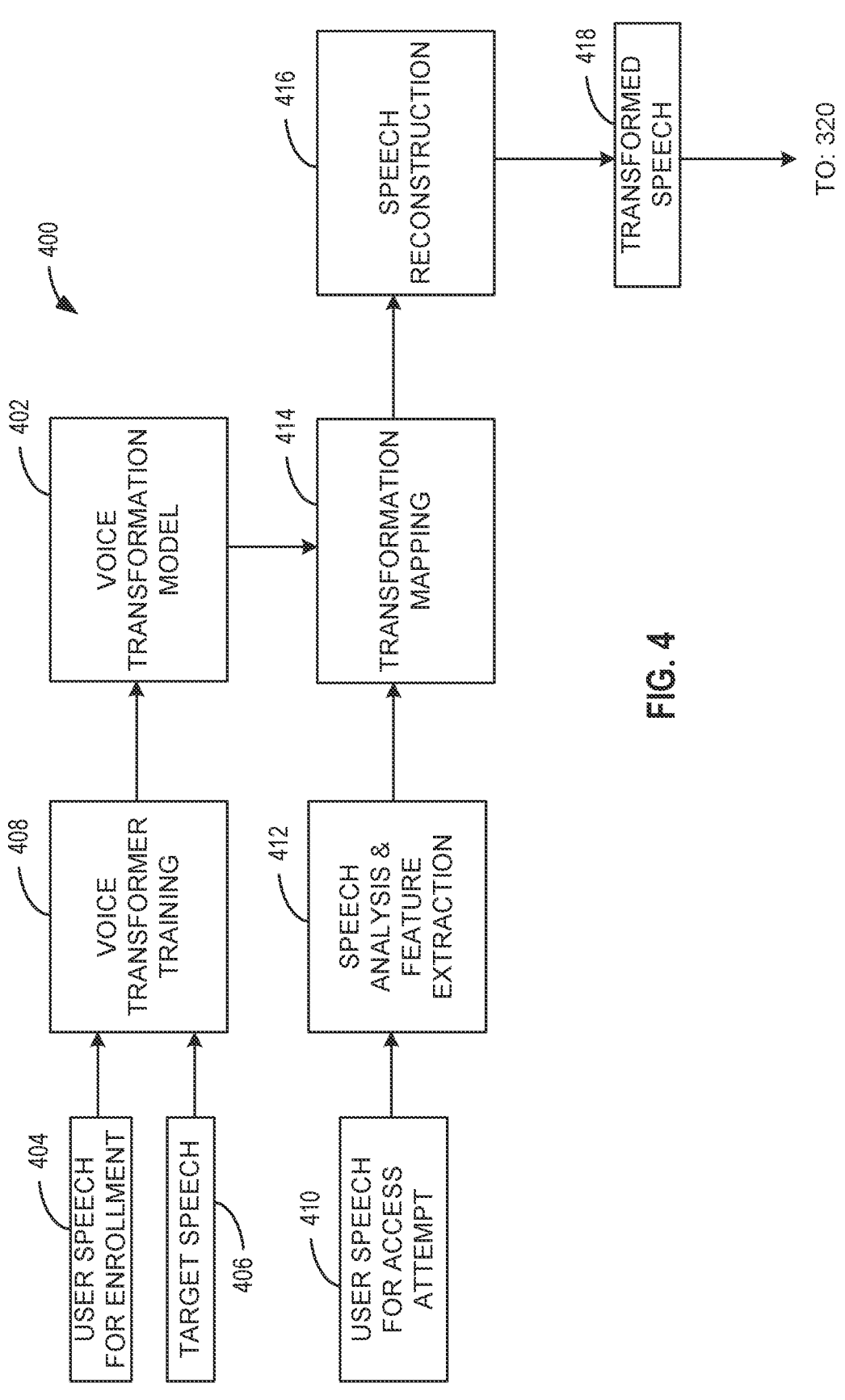
FIG. 4 is a schematic illustration of an example workflow to train and test voice transformation circuitry of the user device and/or the service provider circuitry of FIG. 1.

FIG. 4 illustrates an example workflow 400 implemented by the voice transformation circuitry 240 of FIGS. 2-3 of the user device 110 and/or the service provider circuitry 300 to train and utilize a voice transformation model 402 for user verification. In the illustrated example of FIG. 4, during enrollment, the voice transformation circuitry 240 accesses user speech for enrollment 404 and target speech 406 for voice transformer training 408. The user speech for enrollment 404 (e.g., a user voice signal) can be a voice signal that the microphone 212 captures and that the voice signal filter circuitry 220 filters when the user requests to set up an account for a service that the service provider circuitry 300 provides. The target voice identification circuitry 230 identifies and communicates the target speech 406 (e.g., a target voice signal) to the voice transformation circuitry 240. In the voice transformer training 408, the voice transformation circuitry 240 analyzes the user speech for enrollment 404 and the target speech 406 to extract and determine a relationship between voice-specific features of the user speech for enrollment 404 and voice-specific features of the target speech 406, such as mel-frequency cepstral coefficients. In turn, the voice transformer training 408 produces the voice transformation model 402. In some examples, the voice transformation model 402 maps the user speech for enrollment 404 to the target speech 406. In some examples, the voice transformation model 402 maps the user speech for enrollment 404 to speech that is different from the target speech 406 based on the relationship between the voice-specific features of the user speech for enrollment 404 and the voice-specific features of the target speech 406.

In the illustrated example of FIG. 4, during an account access attempt after enrollment, the voice transformation circuitry 240 accesses user speech for an access attempt 410. The user speech for the access attempt 410 can be a voice signal that the microphone 212 captures and that the voice signal filter circuitry 220 filters when the user requests to access the registered account. The voice transformation circuitry 240 analyzes the user speech for the access attempt

410 and extracts voice-specific features 412, such as mel-frequency cepstral coefficients of the user speech for the access attempt 410. Further, the voice transformation circuitry 240 uses the voice transformation model 402 to perform transformation mapping 414 that adjusts the voice-specific features based on the relationship between the voice-specific features of the user speech for enrollment 404 and the voice-specific features of the target speech 406 learned during the voice transformer training 408. As a result, the transformation mapping 414 produces adjusted voice-specific features (e.g., adjusted mel-frequency cepstral coefficients) that the voice transformation circuitry 240 utilizes to reconstruct the speech during speech reconstruction 416. As a result, the voice transformation circuitry 240 produces transformed speech 418. For example, the speech reconstruction can combine the adjusted voice-specific features with the linguistic content from the user speech for the access attempt 410 to produce the transformed speech 418. In turn, the voice transformation circuitry 240 delivers the transformed speech 418 to the voice authentication circuitry 320 for authentication of the user that provided the user speech for the access attempt 410.

Figure 5:
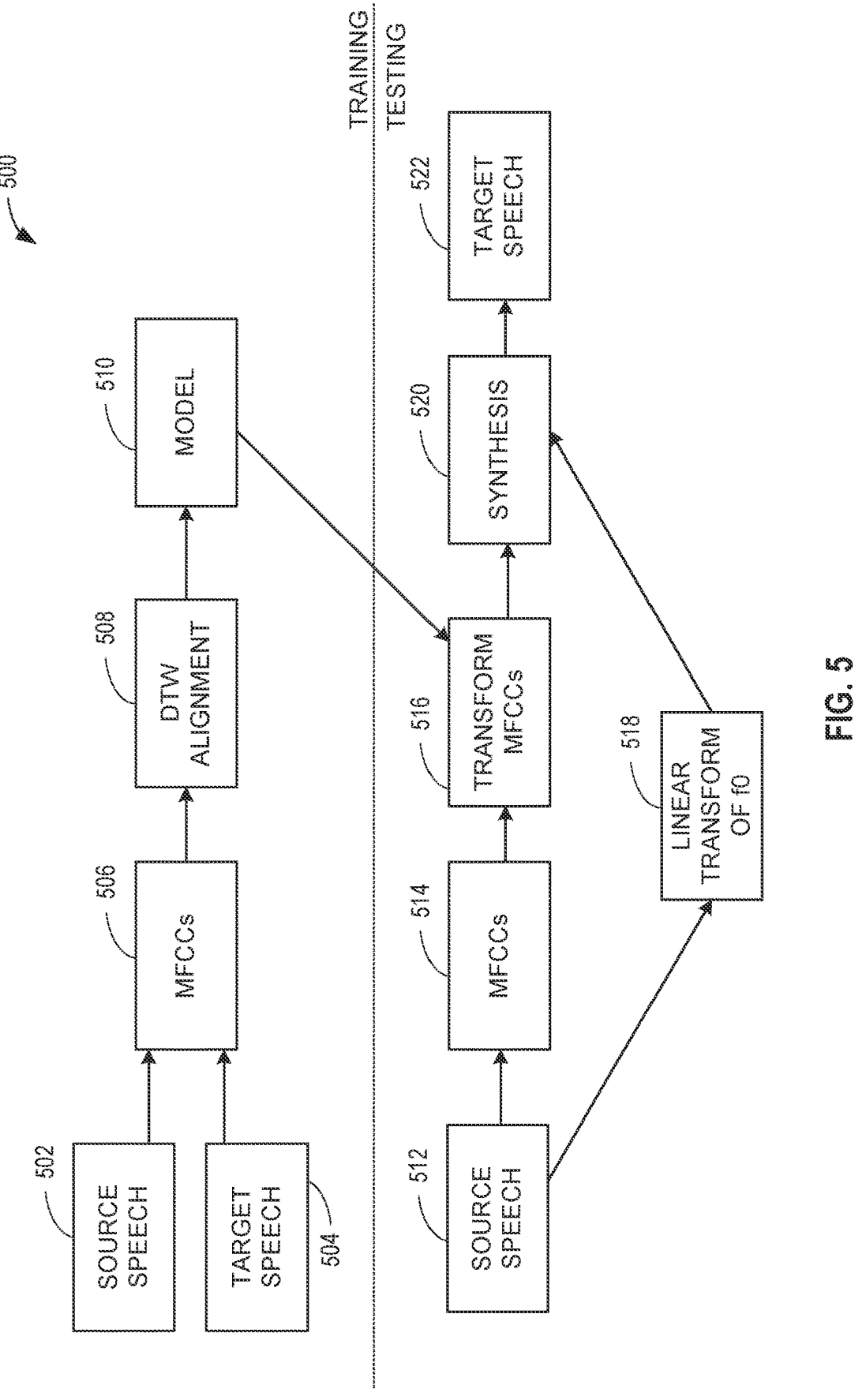
FIG. 5 illustrates a first example implementation of the example workflow of FIG. 4.

FIG. 5 illustrates a first example implementation of the example workflow 400 of FIG. 4. Specifically, FIG. 5 illustrates an example Bi-LSTM voice transformation workflow 500. In the illustrated example of FIG. 5, during training, the voice transformation circuitry 240 extracts mel-frequency cepstral coefficients (MFCCs) 506 from source speech 502 provided by a user registering for an account and from target speech 504 identified by the target voice identification circuitry 230. The voice transformation circuitry 240 performs dynamic time warping (DTW) alignment 508 to align the MFCCs of the source speech 502 and the target speech 504 when the source speech 502 and the target speech 504 have different durations. The voice transformation circuitry 240 inputs the aligned MFCCs of the source speech 502 and the target speech 504 into a Bi-LSTM model 510, which adjusts weights and interconnections that impact an output of the model 510 based on the aligned MFCCs of the source speech 502 and the target speech 504.

In the illustrated example of FIG. 5, during testing (e.g., user verification after an account access request), the voice transformation circuitry 240 extracts MFCCs 514 of source speech 512 provided by the user in association with the account access request. Further, the voice transformation circuitry 240 inputs the MFCCs 514 into the model 510, which outputs transformed MFCCs 516 based on the model weights and interconnections developed during training. Additionally, the voice transformation circuitry 240 performs a linear transform 518 of the source speech 512 in the frequency domain. The voice transformation circuitry 240 then performs a synthesis 520 of the transformed MFCCs 516 with the linear transform 518 to obtain target speech 522, which is sent to the voice authentication circuitry 320 for comparison to enrollment speech for verification. As discussed above, the enrollment speech can match the target speech 504 used for training, or the enrollment speech can be different from the target speech 504 and developed by the model 510. When the enrollment speech is different from the target speech 504, the model 510 outputs the enrollment speech after training, and the voice transformation circuitry 240 sends the enrollment speech to the voice authentication circuitry 320. Accordingly, the voice authentication circuitry can compare the target speech 522 to the enrollment speech to verify that the user that provided the source speech 512 is the same user that set up the account.

Figure 6:
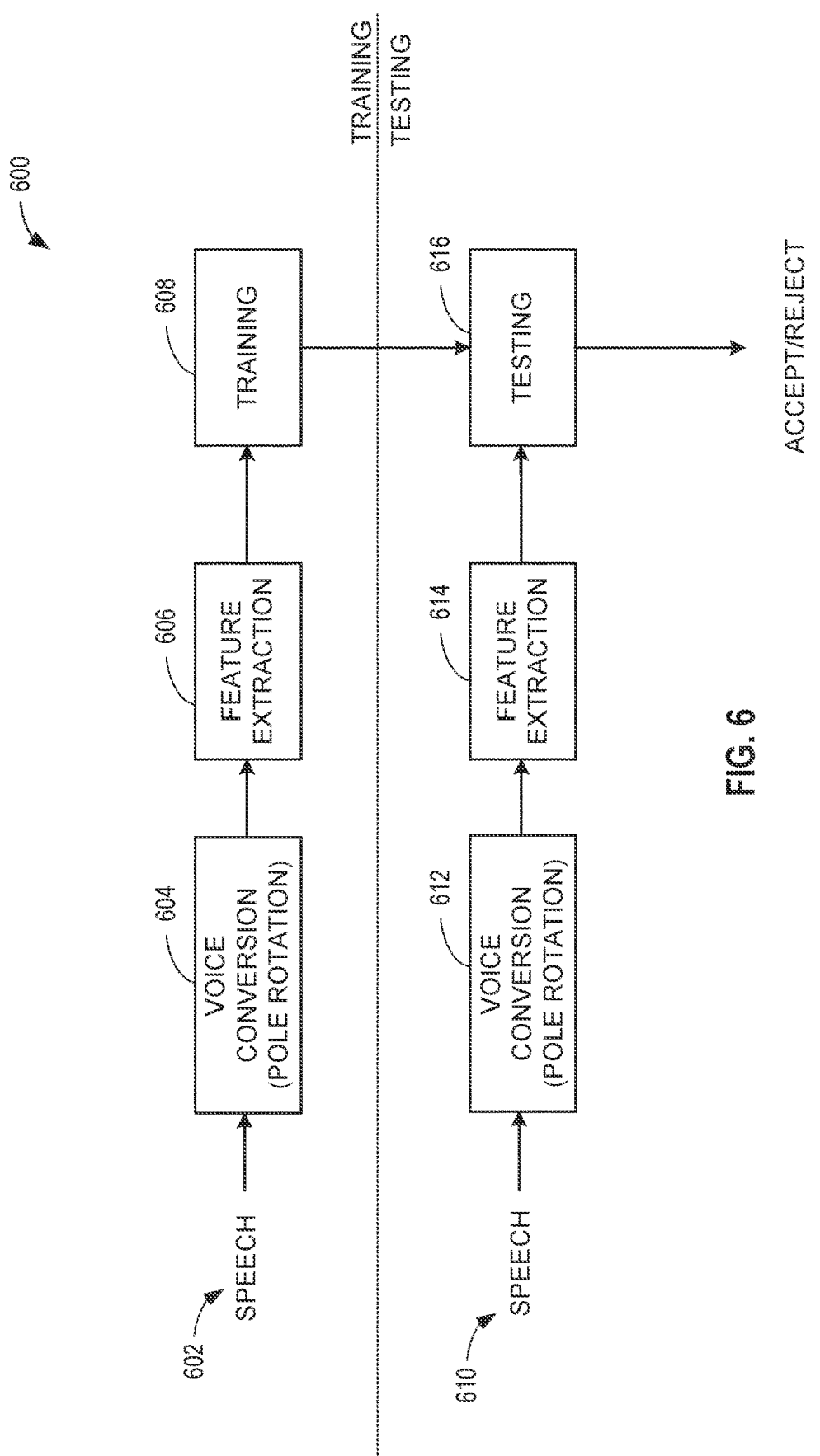
FIG. 6 illustrates a second example implementation of the example workflow of FIG. 4.

FIG. 6 illustrates a second example implementation of the example workflow 400 of FIG. 4. Specifically, FIG. 6 illustrates an example pole rotation workflow 600. In the illustrated example of FIG. 6, during training, the voice transformation circuitry 240 accesses speech 602 from a user during enrollment. The voice transformation circuitry 240 performs a voice conversion of the speech 602 through a first pole rotation 604. The voice transformation circuitry 240 extracts voice-specific features of the converted speech during feature extraction 606. The voice transformation circuitry 240 then uses the extracted voice-specific features for training 608, such as through creation of an enrollment voice that includes the extracted voice-specific features.

During speech testing (e.g., user verification), the voice transformation circuitry 240 again accesses speech 610 from a user. The voice transformation circuitry 240 performs a voice conversion of the speech through a second pole rotation 612 that causes a same rotation as the first pole rotation 604 used to create the enrollment voice. The voice transformation circuitry 240 extracts voice-specific features 614 of the voice that results from the second pole rotation 612. Further, the voice authentication circuitry 320 compares the extracted voice-specific features to the voice-specific features of the enrollment voice that training 608 produced during testing 616. Accordingly, the voice authentication circuitry 320 determines whether to accept or reject the user that provided the speech 610 based on the comparison.

Figure 7:
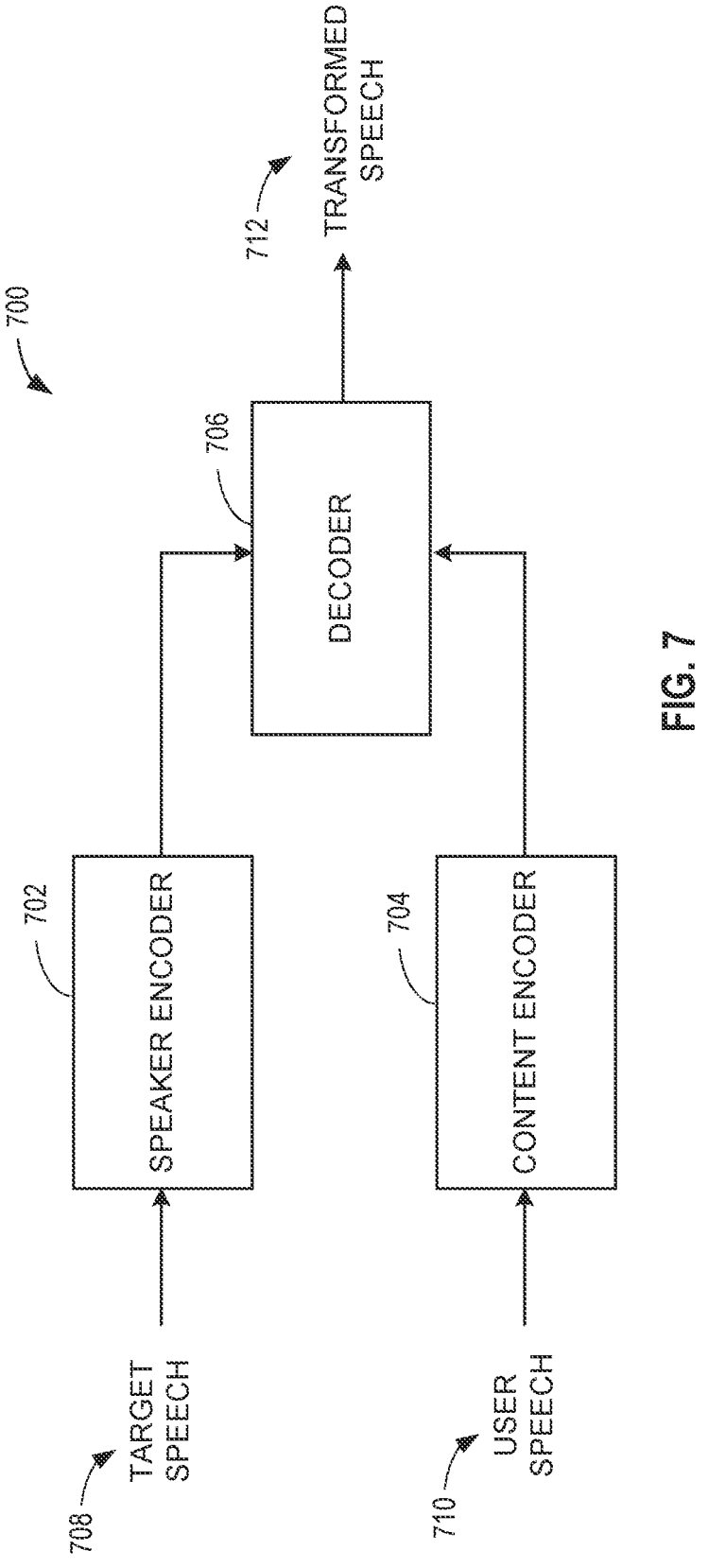
FIG. 7 illustrates a third example implementation of the example workflow of FIG. 4.

FIG. 7 illustrates a third example implementation of the example workflow 400 of FIG. 4. Specifically, FIG. 7 illustrates an example variational autoencoder based one-shot voice conversion system 700. In the illustrated example of FIG. 7, the one-shot voice conversion system 700 includes a speaker encoder 702, a content encoder 704, and a decoder 706. During training, the voice transformation circuitry 240 trains the speaker encoder 702 to extract voice-specific features from a voice signal. For example, the voice transformation circuitry 240 can train the speaker encoder 702 to extract and/or identify a signature associated with the voice signal, such as a pattern in a power and/or frequency spectrum of the voice signal, PLP coefficients, i-vectors, and/or x-vectors associated with the voice signal. Further, the voice transformation circuitry 240 trains the content encoder 704 to extract linguistic content from a voice signal. The voice transformation circuitry 240 trains the decoder 706 to merge the extracted voice-specific features with the linguistic content to produce transformed speech.

In the illustrated example of FIG. 7, during enrollment and user verification, the speaker encoder 702 accesses target speech 708 (e.g., a speech signal identified by the target voice identification circuitry 230) and extracts voice-specific features of the target speech 708. The speaker encoder 702 delivers the voice-specific features of the target speech 708 to the decoder 706. Further, the content encoder 704 accesses user speech 710 and extracts linguistic content therefrom. In turn, the content encoder 704 delivers the linguistic content to the decoder 706. The decoder 706 merges the voice-specific features of the target speech 708 with the linguistic content of the user speech 710 to produce transformed speech 712 to be utilized as an enrollment voice for the account and/or a transformed voice for comparison to the enrollment voice during an account access attempt. Although FIGS. 5, 6, and 7 illustrate example implementations of the workflow 400 of FIG. 4, it should be understood that alternative implementations can be utilized to transform a voice input provided by a user.

Figure 8:
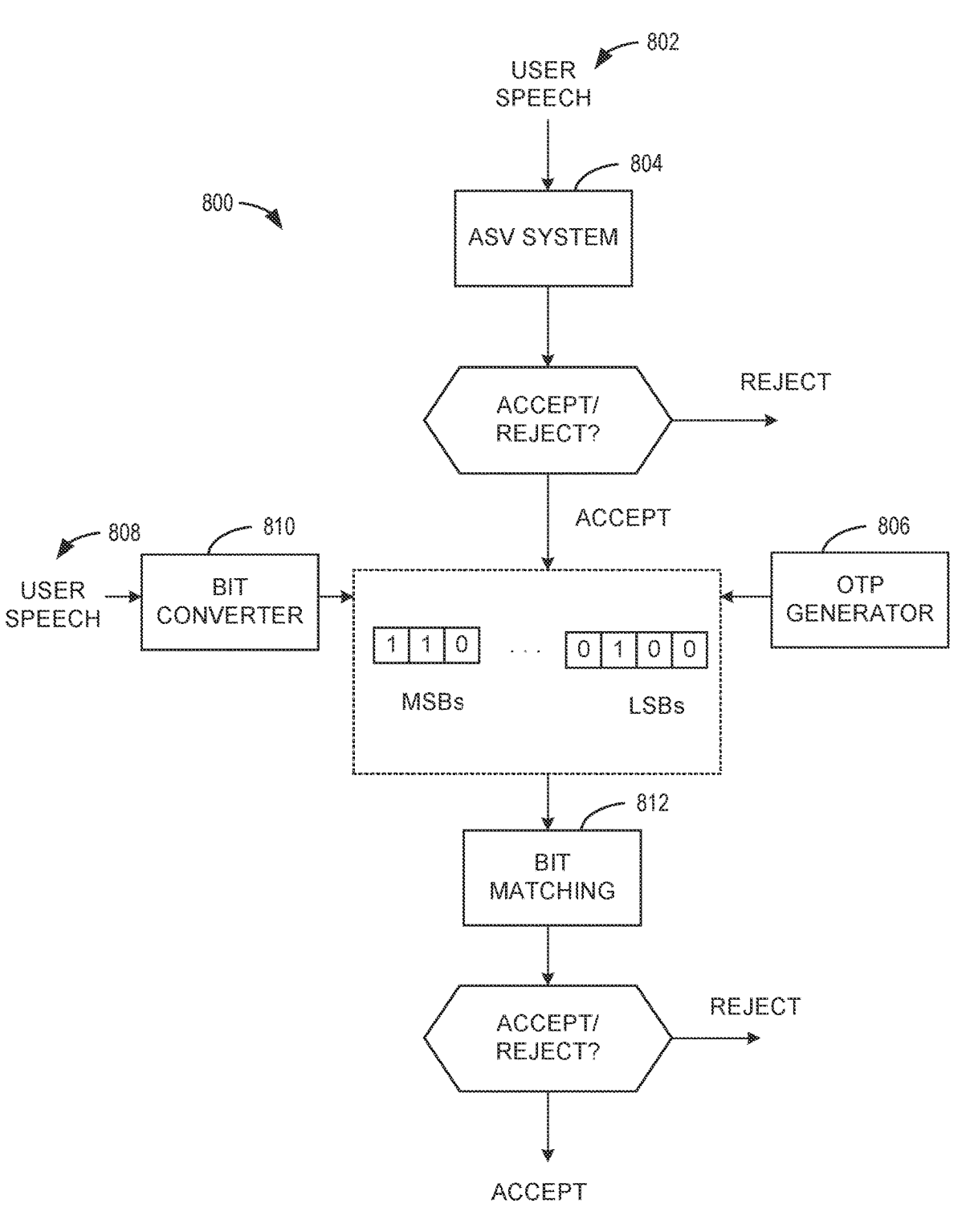
FIG. 8 is a schematic illustration of an example workflow to embed and identify metadata in a voice signal.

FIG. 8 is a schematic illustration of an example workflow 800 to embed and identify metadata in a voice signal for multi-factor authentication (MFA). In the illustrated example of FIG. 8, first user speech 802 is delivered to an automatic speaker verification (ASV) system 804. If the ASV system 804 determines that voice-specific features associated with the first user speech 802 match voice-specific features of an enrollment voice associated with the account/service to which the user device 110 requests access, then the ASV system accepts the first user speech 802. Otherwise, the ASV system 804 rejects the first user speech 802. The ASV system 804 provides a first level of user authentication.

In the illustrated example of FIG. 8, a second level of user authentication is provided by a one-time password (OTP) generator 806 (e.g., the metadata insertion circuitry 250 of FIGS. 2 and 3). For example, the user device 110 can receive an OTP from the service provider circuitry 300 in response to passing the first level of user authentication. In this second level of user authentication, the user provides second user speech 808, and the bit converter 810 converts the user speech 808 into a bit sequence. The OTP generator 806 can identify least significant bits of the bit sequence. That is, the OTP generator 806 can distinguish between most significant bits (MSBs) and least significant bits (LSBs) in the bit sequence. Further, the OTP generator 806 can embed metadata indicative of the OTP received from the service provider circuitry 300 in the least significant bits. Additionally, the OTP generator 806 can embed other information in the least significant bits, such as information associated with the user device 110 (e.g., a device footprint, a location, a MAC address, etc.). The user device 110 can transmit the bit stream with the embedded metadata to the service provider circuitry 300. The metadata identification circuitry 255 of the service provider circuitry 300 can perform bit matching 812 to determine whether the bitstream includes the OTP and/or other expected information. Accordingly, when the metadata identification circuitry 255 determines the bitstream includes the OTP and/or the other expected information, the service provider circuitry 300 can enable the user device 110 to access the associated account/service.

While an example manner of implementing the user device 110 and the first and second service provider circuitry 120, 121 of FIG. 1 is illustrated in FIGS. 2 and 3, one or more of the elements, processes, and/or devices illustrated in FIGS. 2 and 3 may be combined, divided, re-arranged, omitted, eliminated, and/or implemented in any other way. Further, the example user interface circuitry 210, the example microphone 212, the example voice signal filter circuitry 220, the example target voice identification circuitry 230, the example voice transformation circuitry 240, the example metadata insertion circuitry 250, the example metadata identification circuitry 255, the example user device interface circuitry 260, the example target voice database 270, the example voice transformer database 280, the example metadata database 290, the example service provider interface circuitry 310, the example voice authentication circuitry 320, the example user authentication database 340, and/or, more generally, the example user device 110 and the example service provider circuitry 300 of FIGS. 2 and 3, may be implemented by hardware alone or by hardware in combination with software and/or firmware. Thus, for example, any of the example user interface circuitry 210, the example microphone 212, the example voice signal filter circuitry 220, the example target voice identification circuitry 230, the example voice transformation circuitry 240, the example metadata insertion circuitry 250, the example metadata identification circuitry 255, the example user device interface circuitry 260, the example target voice database 270, the example voice transformer database 280, the example metadata database 290, the example service provider interface circuitry 310, the example voice authentication circuitry 320, the example user authentication database 340, and/or, more generally, the example user device 110 and the example service provider circuitry 300, could be implemented by programmable circuitry in combination with machine readable instructions (e.g., firmware or software), processor circuitry, analog circuit(s), digital circuit(s), logic circuit(s), programmable processor(s), programmable microcontroller(s), graphics processing unit(s) (GPU(s)), digital signal processor(s) (DSP(s)), ASIC(s), programmable logic device(s) (PLD(s)), and/or field programmable logic device(s) (FPLD(s)) such as FPGAs. Further still, the example user device 110 and the service provider circuitry 300 of FIGS. 2 and 3 may include one or more elements, processes, and/or devices in addition to, or instead of, those illustrated in FIGS. 2 and 3, and/or may include more than one of any or all of the illustrated elements, processes and devices.

Flowcharts representative of example machine readable instructions, which may be executed by programmable circuitry to implement and/or instantiate the user device 110 and the service provider circuitry 300 of FIGS. 2 and 3 and/or representative of example operations which may be performed by programmable circuitry to implement and/or instantiate the user device 110 and the service provider circuitry 300 of FIGS. 2 and 3, are shown in FIGS. 9-12. The machine readable instructions may be one or more executable programs or portion(s) of one or more executable programs for execution by programmable circuitry such as the programmable circuitry 1312, 1412 shown in the example processor platforms 1300, 1400 discussed below in connection with FIGS. 13 and 14 and/or may be one or more function(s) or portion(s) of functions to be performed by the example programmable circuitry (e.g., an FPGA) discussed below in connection with FIGS. 15 and/or 16. In some examples, the machine readable instructions cause an operation, a task, etc., to be carried out and/or performed in an automated manner in the real world. As used herein, "automated" means without human involvement.

The program may be embodied in instructions (e.g., software and/or firmware) stored on one or more non-transitory computer readable and/or machine readable storage medium such as cache memory, a magnetic-storage device or disk (e.g., a floppy disk, a Hard Disk Drive (HDD), etc.), an optical-storage device or disk (e.g., a Blu-ray disk, a Compact Disk (CD), a Digital Versatile Disk (DVD), etc.), a Redundant Array of Independent Disks (RAID), a register, ROM, a solid-state drive (SSD), SSD memory, non-volatile memory (e.g., electrically erasable programmable read-only memory (EEPROM), flash memory, etc.), volatile memory (e.g., Random Access Memory (RAM) of any type, etc.), and/or any other storage device or storage disk. The instructions of the non-transitory computer readable and/or machine readable medium may program and/or be executed by programmable circuitry located in one or more hardware devices, but the entire program and/or parts thereof could alternatively be executed and/or instantiated by one or more hardware devices other than the programmable circuitry and/or embodied in dedicated hardware. The machine readable instructions may be distributed across multiple hardware devices and/or executed by two or more hardware devices (e.g., a server and a client hardware device). For example, the client hardware device may be implemented by an endpoint client hardware device (e.g., a hardware device associated with a human and/or machine user) or an intermediate client hardware device gateway (e.g., a radio access network (RAN)) that may facilitate communication between a server and an endpoint client hardware device. Similarly, the non-transitory computer readable storage medium may include one or more mediums. Further, although the example program is described with reference to the flowchart(s) illustrated in FIGS. 9-12, many other methods of implementing the example user device 110 and/or the example service provider circuitry 300 may alternatively be used. For example, the order of execution of the blocks of the flowchart(s) may be changed, and/or some of the blocks described may be changed, eliminated, or combined. Additionally or alternatively, any or all of the blocks of the flow chart may be implemented by one or more hardware circuits (e.g., processor circuitry, discrete and/or integrated analog and/or digital circuitry, an FPGA, an ASIC, a comparator, an operational-amplifier (op-amp), a logic circuit, etc.) structured to perform the corresponding operation without executing software or firmware. The programmable circuitry may be distributed in different network locations and/or local to one or more hardware devices (e.g., a single-core processor (e.g., a single core CPU), a multi-core processor (e.g., a multi-core CPU, an XPU, etc.)). For example, the programmable circuitry may be a CPU and/or an FPGA located in the same package (e.g., the same integrated circuit (IC) package or in two or more separate housings), one or more processors in a single machine, multiple processors distributed across multiple servers of a server rack, multiple processors distributed across one or more server racks, etc., and/or any combination(s) thereof.

The machine readable instructions described herein may be stored in one or more of a compressed format, an encrypted format, a fragmented format, a compiled format, an executable format, a packaged format, etc. Machine readable instructions as described herein may be stored as data (e.g., computer-readable data, machine-readable data, one or more bits (e.g., one or more computer-readable bits, one or more machine-readable bits, etc.), a bitstream (e.g., a computer-readable bitstream, a machine-readable bitstream, etc.), etc.) or a data structure (e.g., as portion(s) of instructions, code, representations of code, etc.) that may be utilized to create, manufacture, and/or produce machine executable instructions. For example, the machine readable instructions may be fragmented and stored on one or more storage devices, disks and/or computing devices (e.g., servers) located at the same or different locations of a network or collection of networks (e.g., in the cloud, in edge devices, etc.). The machine readable instructions may require one or more of installation, modification, adaptation, updating, combining, supplementing, configuring, decryption, decompression, unpacking, distribution, reassignment, compilation, etc., in order to make them directly readable, interpretable, and/or executable by a computing device and/or other machine. For example, the machine readable instructions may be stored in multiple parts, which are individually compressed, encrypted, and/or stored on separate computing devices, wherein the parts when decrypted, decompressed, and/or combined form a set of computer-executable and/or machine executable instructions that implement one or more functions and/or operations that may together form a program such as that described herein.

In another example, the machine readable instructions may be stored in a state in which they may be read by programmable circuitry, but require addition of a library (e.g., a dynamic link library (DLL)), a software development kit (SDK), an application programming interface (API), etc., in order to execute the machine-readable instructions on a particular computing device or other device. In another example, the machine readable instructions may need to be configured (e.g., settings stored, data input, network addresses recorded, etc.) before the machine readable instructions and/or the corresponding program(s) can be executed in whole or in part. Thus, machine readable, computer readable and/or machine readable media, as used herein, may include instructions and/or program(s) regardless of the particular format or state of the machine readable instructions and/or program(s).

The machine readable instructions described herein can be represented by any past, present, or future instruction language, scripting language, programming language, etc. For example, the machine readable instructions may be represented using any of the following languages: C, C++, Java, C#, Perl, Python, JavaScript, HyperText Markup Language (HTML), Structured Query Language (SQL), Swift, etc.

As mentioned above, the example operations of FIGS. 9-12 may be implemented using executable instructions (e.g., computer readable and/or machine readable instructions) stored on one or more non-transitory computer readable and/or machine readable media. As used herein, the terms non-transitory computer readable medium, non-transitory computer readable storage medium, non-transitory machine readable medium, and/or non-transitory machine readable storage medium are expressly defined to include any type of computer readable storage device and/or storage disk and to exclude propagating signals and to exclude transmission media. Examples of such non-transitory computer readable medium, non-transitory computer readable storage medium, non-transitory machine readable medium, and/or non-transitory machine readable storage medium include optical storage devices, magnetic storage devices, an HDD, a flash memory, a read-only memory (ROM), a CD, a DVD, a cache, a RAM of any type, a register, and/or any other storage device or storage disk in which information is stored for any duration (e.g., for extended time periods, permanently, for brief instances, for temporarily buffering, and/or for caching of the information). As used herein, the terms "non-transitory computer readable storage device" and "non-transitory machine readable storage device" are defined to include any physical (mechanical, magnetic and/or electrical) hardware to retain information for a time period, but to exclude propagating signals and to exclude transmission media. Examples of non-transitory computer readable storage devices and/or non-transitory machine readable storage devices include random access memory of any type, read only memory of any type, solid state memory, flash memory, optical discs, magnetic disks, disk drives, and/or redundant array of independent disks (RAID) systems. As used herein, the term "device" refers to physical structure such as mechanical and/or electrical equipment, hardware, and/or circuitry that may or may not be configured by computer readable instructions, machine readable instructions, etc., and/or manufactured to execute computer-readable instructions, machine-readable instructions, etc.

"Including" and "comprising" (and all forms and tenses thereof) are used herein to be open ended terms. Thus, whenever a claim employs any form of "include" or "comprise" (e.g., comprises, includes, comprising, including, having, etc.) as a preamble or within a claim recitation of any kind, it is to be understood that additional elements, terms, etc., may be present without falling outside the scope of the corresponding claim or recitation. As used herein, when the phrase "at least" is used as the transition term in, for example, a preamble of a claim, it is open-ended in the same manner as the term "comprising" and "including" are open ended. The term "and/or" when used, for example, in a form such as A, B, and/or C refers to any combination or subset of A, B, C such as (1) A alone, (2) B alone, (3) C alone, (4) A with B, (5) A with C, (6) B with C, or (7) A with B and with C. As used herein in the context of describing structures, components, items, objects and/or things, the phrase "at least one of A and B" is intended to refer to implementations including any of (1) at least one A, (2) at least one B, or (3) at least one A and at least one B. Similarly, as used herein in the context of describing structures, components, items, objects and/or things, the phrase "at least one of A or B" is intended to refer to implementations including any of (1) at least one A, (2) at least one B, or (3) at least one A and at least one B. As used herein in the context of describing the performance or execution of processes, instructions, actions, activities and/or steps, the phrase "at least one of A and B" is intended to refer to implementations including any of (1) at least one A, (2) at least one B, or (3) at least one A and at least one B. Similarly, as used herein in the context of describing the performance or execution of processes, instructions, actions, activities and/or steps, the phrase "at least one of A or B" is intended to refer to implementations including any of (1) at least one A, (2) at least one B, or (3) at least one A and at least one B.

As used herein, singular references (e.g., "a", "an", "first", "second", etc.) do not exclude a plurality. The term "a" or "an" object, as used herein, refers to one or more of that object. The terms "a" (or "an"), "one or more", and "at least one" are used interchangeably herein. Furthermore, although individually listed, a plurality of means, elements, or actions may be implemented by, e.g., the same entity or object. Additionally, although individual features may be included in different examples or claims, these may possibly be combined, and the inclusion in different examples or claims does not imply that a combination of features is not feasible and/or advantageous.

Figure 9:
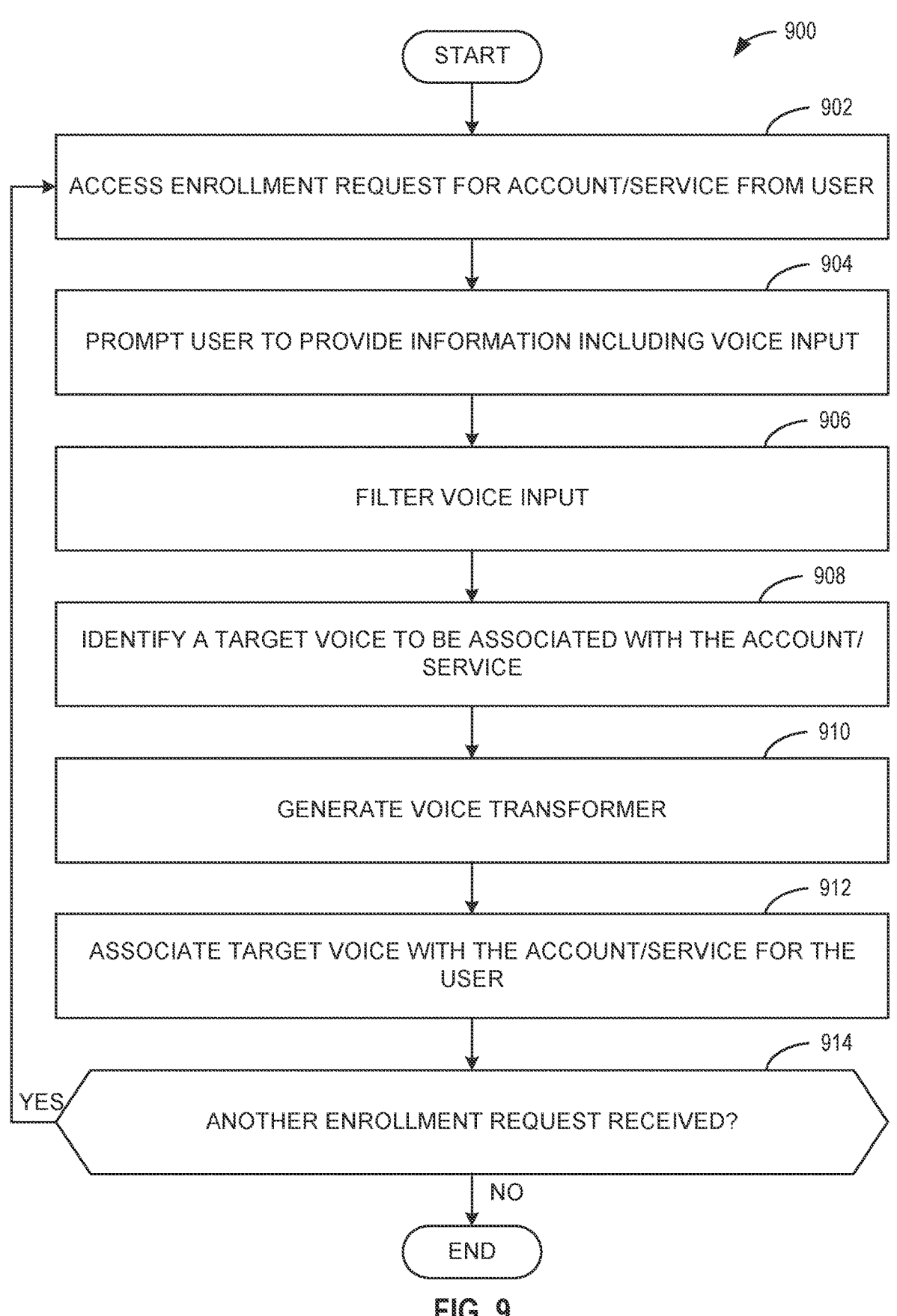
FIG. 9 is a flowchart representative of example machine readable instructions and/or example operations that may be executed, instantiated, and/or performed by example programmable circuitry to implement the user device and/or the service provider circuitry of FIGS. 2-3.

FIG. 9 is a flowchart representative of example machine readable instructions and/or example operations 900 that may be executed, instantiated, and/or performed by programmable circuitry to enroll a user in an account and/or a service that utilizes a transformed voice for authentication. The example machine-readable instructions and/or the example operations 900 of FIG. 9 begin at block 902, at which the service provider circuitry 300 (e.g., the first service provider circuitry 120, the second service provider circuitry 121) accesses an enrollment request for an account and/or a service from a user. For example, the user device 110 can generate a request to create an account, such as a financial account (e.g., a bank account, an investment account, etc.), an ecommerce account, a subscription, etc., based on an input received from the user at the user interface circuitry 210. The user device 110 relays the enrollment request to the service provider circuitry 300. Accordingly, the service provider interface circuitry 310 accesses the enrollment request. In some examples, the user device 110 determines whether to transmit the enrollment request to the first service provider circuitry 120 or the second service provider circuitry 121 based on the input from the user that the user interface circuitry 210 receives.

At block 904, the user device 110 prompts the user to provide information including a voice input. For example, the user device 110 can audibly and/or visually prompt the user via the user interface circuitry 210. In some examples, the service provider circuitry 300 causes the user device 110 to prompt the user to provide the information including the voice input after receiving the enrollment request. The user device 110 can request a username, a password, an address, payment information, enrollment/subscription information, and/or other personal information from the user via the user interface circuitry 210. Additionally, the user device 110 instructs the user to record themself speaking via the user interface circuitry 210. For example, the user interface circuitry 210 can present a prompt for the user to read and direct the user to start and stop a recording by the microphone 212 via the user interface circuitry 210. Accordingly, the microphone 212 records the voice input provided by the user and generates a corresponding voice signal.

At block 906, the user device 110 filters the voice input. For example, the voice signal filter circuitry 220 can filter the voice signal generated by the microphone 212 to remove background noise (e.g., from a television, a speaker, a ceiling fan, etc.) that is separate from the voice input provided by the user. In some examples, to filter the voice input, the voice signal filter circuitry 220 applies a high-pass filter and/or a low-pass filter to the voice signal. Accordingly, the voice signal filter circuitry 220 can generate a filtered voice signal.

At block 908, the user device 110 or the service provider circuitry 300 identifies a target voice to be associated with the user-specific account and/or service to which the user is enrolling. For example, the target voice identification circuitry 230 can determine the target voice to associate with the user account. In some examples, the target voice identification circuitry 230 causes the user interface circuitry 210 to prompt the user to select a target voice. For example, the user interface circuitry 210 can present a list of identifiers of available target voices via a dropdown menu. In such examples, the target voice identification circuitry 230 identifies the target voice based on an option in the dropdown menu selected by the user. In some examples, the target voice identification circuitry 230 automatically determines the target voice (i.e., without a user selection). For example, the target voice identification circuitry 230 can determine the target voice based on information associated with the user device 110 (e.g., a device footprint, a driver associated with the microphone 212), information associated with the user provided in association with the enrollment. Alternatively, the target voice identification circuitry 230 can randomly select the target voice. In some examples, the target voice identification circuitry 230 selects the target voice from a pool of available target voices (e.g., target voices not yet assigned to a user account) stored via the target voice database 270. In some examples, the target voice identification circuitry 230 identifies the available target voices based on a threshold difference to be maintained between the respective target voices for uniqueness. For example, the target voice identification circuitry 230 can determine that cosine similarities between the target voices in the pool are to satisfy (e.g., be less than, be less than or equal to) a threshold. In such examples, the target voice identification circuitry 230 can determine the threshold difference based on the system and/or service for which the user verification is being performed.

At block 910, the user device 110 or the service provider circuitry 300 generates a voice transformer. For example, the voice transformation circuitry 240 can develop and/or train a voice transformer (e.g., a machine-learning model, a voice transformation model) to convert the voice input from the user into the target voice. In some examples, the voice transformation circuitry 240 analyzes the voice signal to identify first voice-specific features. Further, the voice transformation circuitry 240 can train the voice transformer to map the first voice-specific features to second voice-specific features associated with the target voice. For example, the voice transformation circuitry 240 can extract a first mel-frequency cepstrum (e.g., first mel-frequency cepstral coefficients) associated with the voice signal and identify a second mel-frequency cepstrum (e.g., second mel-frequency cepstral coefficients) associated with the target voice. In some examples, to obtain the mel-frequency cepstrum, the voice transformation circuitry 240 takes the Fourier transform of the filtered voice signal; maps the powers of the spectrum obtained from the Fourier transform onto the mel scale (e.g., via triangular overlapping windows or cosine overlapping windows); takes the logs of the powers at each of the mel frequencies; and takes the discrete cosine transform of the list of mel log powers. The amplitudes of the resulting spectrum define the mel-frequency cepstral coefficients that form the mel-frequency cepstrum. The voice transformation circuitry 240 can identify a relationship between the first mel-frequency cepstrum and the second mel-frequency cepstrum. Further, the voice transformation circuitry 240 can train the voice transformer to develop a function that adjusts the first mel-frequency cepstrum to the second mel-frequency cepstrum. In some examples, the voice transformation circuitry 240 trains the voice transformer to transform the first voice-specific features of the second voice-specific features based on a certain function, such as a certain pole rotation. In some examples, the voice transformation circuitry 240 trains the voice transformer to form the second voice-specific features with linguistic content from the voice input from the user.

In some examples, the voice transformation circuitry 240 stores the trained voice transformer with an identification value in the voice transformer database 280. In some examples, the voice transformation circuitry 240 causes the user interface circuitry 210 to present the identification value of the voice transformer to the user with instructions to recall the identification value for future access attempts. In some examples, the voice transformation circuitry 240 uses an identifier of the target voice that the user selected as the identification value of the voice transformer. In some examples, the voice transformation circuitry 240 stores the trained voice transformer with personal information (e.g., name, address, etc.), account information (e.g., username, password, etc.), and/or information associated with the user device 110 (e.g., a device footprint, an identifier of the driver associated with the microphone 212) in the voice transformer database 280 such that the voice transformation circuitry 240 can recall the particular voice transformer associated with the user account/subscription in response to receiving a subsequent access attempt from the user device 110 and/or with the same personal information.

At block 912, the service provider circuitry 300 associates the target voice with the user account and/or service subscription. For example, the voice authentication circuitry 320 can link the target voice, or the second voice-specific features, with the account and/or service subscription information (e.g., with a username and password provided by the user). Further, the voice authentication circuitry 320 can store the linked target voice and the account and/or service subscription information via the user authentication database 340.

At block 914, the service provider circuitry 300 determines whether another enrollment request has been received. For example, the user device 110 notifies the respective service provider circuitry 120, 121 when the user, or a different user, submits an enrollment request for another account and/or service subscription at the user interface circuitry 210. When the service provider circuitry 300 determines another enrollment request has been received (block 914 returns a result of "YES"), the operations 900 return to block 902. Otherwise, when the service provider circuitry 300 determines that another enrollment request has not been received (e.g., block 914 returns a result of "NO"), the operations 900 terminate.

FIG. 10 is a flowchart representative of example machine readable instructions and/or example operations 1000 that may be executed, instantiated, and/or performed by programmable circuitry to authenticate a user requesting access to an account and/or a service subscription based on a transformed voice. The example machine-readable instructions and/or the example operations 1000 of FIG. 10 begin at block 1002, at which the service provider circuitry 300 identifies a request to access an account and/or a service subscription from a user. For example, the user device 110 can transmit a signal indicative of a request to access the account and/or the service subscription to the respective service provider circuitry 120, 121 in response to the user interface circuitry 210 receiving an input indicative of the request. As a result, the service provider circuitry 300 can identify the request in response to receiving the signal indicative of the request from the user device 110 via the network 130.

At block 1004, the user device 110 prompts the user to provide information including a voice input. For example, after the service provider circuitry 300 identifies the request to access the account and/or the service subscription, the service provider circuitry 300 can cause the user device 110 to prompt the user to provide login information including a voice input via the user interface circuitry 210. In turn, the microphone 212 can capture the voice input and the user interface circuitry 210 can capture other login information, such as a username and password (e.g., via a touchpad, a keyboard, a mouse, etc.).

At block 1006, the user device 110 or the service provider circuitry 300 identifies the voice transformer to be utilized for the access attempt. For example, the voice transformation circuitry 240 can identify the voice transformer. In some examples, the voice transformation circuitry 240 identifies the voice transformer based on an input from the user that the user interface circuitry 210 receives. For example, the user can recall the voice transformer selected and/or assigned to the account during enrollment and select or input the identification value associated with the voice transformer. In some examples, the voice transformation circuitry 240 identifies the voice transformer based on information associated with the user device 110, the account, and/or the service provider circuitry 300 associated with the access attempt. For example, the voice transformation circuitry 240 can perform a look-up in the voice transformer database 280 to identify the voice transformer associated with the user device 110, the account information, and/or the service provider circuitry 300 to which the access attempt is to be transmitted.

In some examples, the voice transformation circuitry 240 identifies the voice transformer associated with the account information provided by the user (e.g., the username and password) as well as the footprint of the user device 110, the driver of microphone 212, and/or other information associated with the user device 110 in the voice transformer database 280. In some examples, when the user intends to access the account from multiple user devices, the user authorizes usage of another user device (e.g., a device not used for enrollment) via the user device 110. For example, after receiving a request to access the account from the other user device, the voice transformation circuitry 240 can trigger the user device 110 and/or another verified device (e.g., a verified mobile phone associated with the user) to prompt the user to indicate whether the usage of the other user device is authorized. Further, when the user indicates that the usage of the other user device is authorized, the voice transformation circuitry 240 can add information associated with the other user device to the voice trans-former database 280 and link such information with the voice transformer associated with the account for future access attempts.

At block 1008, the user device 110 or the service provider circuitry 300 generates a transformed voice based on the received voice input and the identified voice transformer. For example, the voice transformation circuitry 240 can apply the voice transformer to the voice input to obtain the transformed voice. In some examples, the voice transforma-tion circuitry 240 adjusts first voice-specific features asso-ciated with the voice input based on the mapping of second voice-specific features to third voice-specific features set by the voice transformer during enrollment. For example, the voice transformation circuitry 240 can adjust the mel-fre-quency cepstrum of the voice input based on the mapping function that the voice transformer learned for the enroll-ment of the account. In some examples, the voice transfor-mation circuitry 240 replaces the first voice-specific features with the third voice-specific features associated with the target voice while preserving linguistic content in the voice input. In some examples, the voice transformation circuitry 240 causes the voice transformer to perform a pole rotation of the voice input to adjust the first voice-specific features to the third voice-specific features associated with the target voice.

When the service provider circuitry 300 transforms the voice input, the user device interface circuitry 260 transmits the voice input to the service provider circuitry 300 via the network 130. Accordingly, the service provider interface circuitry 310 can receive the voice input, and the voice transformation circuitry 240 can access the received voice input. When the user device 110 transforms the voice input, the user device interface circuitry 260 transmits the trans-formed voice to the service provider circuitry 300 via the network 130 after the voice transformation circuitry 240 performs the transformation at the user device 110.

At block 1010, the service provider circuitry 300 deter-mines whether the transformed voice matches the enroll-ment voice for the account and/or service subscription to which the user device 110 requests access. For example, the voice authentication circuitry 320 can compare a first voice signature of the transformed voice to a second voice signa-ture of the enrollment voice associated with the account/ service subscription to determine whether the transformed voice includes the same voice-specific features as the enroll-ment voice. In some examples, the voice authentication circuitry 320 compares first mel-frequency cepstral coeffi-cients of the transformed voice to second mel-frequency cepstral coefficients of the enrollment voice. In such examples, the voice authentication circuitry 320 determines that the transformed voice matches the enrollment voice when the first mel-frequency cepstral coefficients match the second mel-frequency cepstral coefficients. In some examples, the voice authentication circuitry 320 determines a cosine similarity between the transformed voice signature and the enrollment voice signature. In such examples, the voice authentication circuitry 320 determines the transformed voice matches the enrollment voice when the cosine similarity satisfies a threshold (e.g., 0.9 with a standard deviation of 0.5, 0.95 with a standard deviation of 0.25). When the voice authentication circuitry 320 determines that the transformed voice matches the enrollment voice (block 1010 returns a result of "YES"), the operations 1000 proceed to block 1012. Otherwise, when the voice authentication circuitry 320 determines that the transformed voice does not match the enrollment voice (block 1010 returns a result of "NO"), the operations proceed to block 1014.

At block 1012, the service provider circuitry 300 provides the user device 110 access to the account and/or the service. Specifically, when the voice authentication circuitry 320 determines that the transformed voice matches the enroll-ment voice, the voice authentication circuitry 320 can cause the service provider interface circuitry 310 to grant the user device 110 access to the account and/or the service via the network 130. For example, the service provider interface circuitry 310 can transmit content associated with the account and/or the service to the user device 110. As a result, the authenticated user can access the account and/or the service at the user device 110.

At block 1014, the service provider circuitry 300 denies the user device 110 access to the account and/or the service. For example, when the voice authentication circuitry 320 determines that the transformed voice does not match the enrollment voice, the voice authentication circuitry 320 can cause the service provider interface circuitry 310 to transmit a signal indicative of the access attempt being denied to the user device 110 via the network 130. In such examples, in response to the user device 110 receiving the signal indica-tive of the denied access attempt, the user interface circuitry 210 can indicate the denied access attempt to the user.

At block 1016, the user device 110 and/or the service provider circuitry 300 determine whether another access request has been received. For example, the user device 110 can notify the respective service provider circuitry 300 when the user, or a different user, requests access to an account and/or service subscription at the user interface circuitry 210. When the user device 110 and/or the service provider circuitry 300 determine that another access request has been received (block 1016 returns a result of "YES"), the opera-tions 1000 return to block 1002. Otherwise, when the user device 110 and/or the service provider circuitry 300 deter-mine that another access request has not been received (block 1016 returns a result of "NO"), the operations 1000 terminate.

Figure 11:
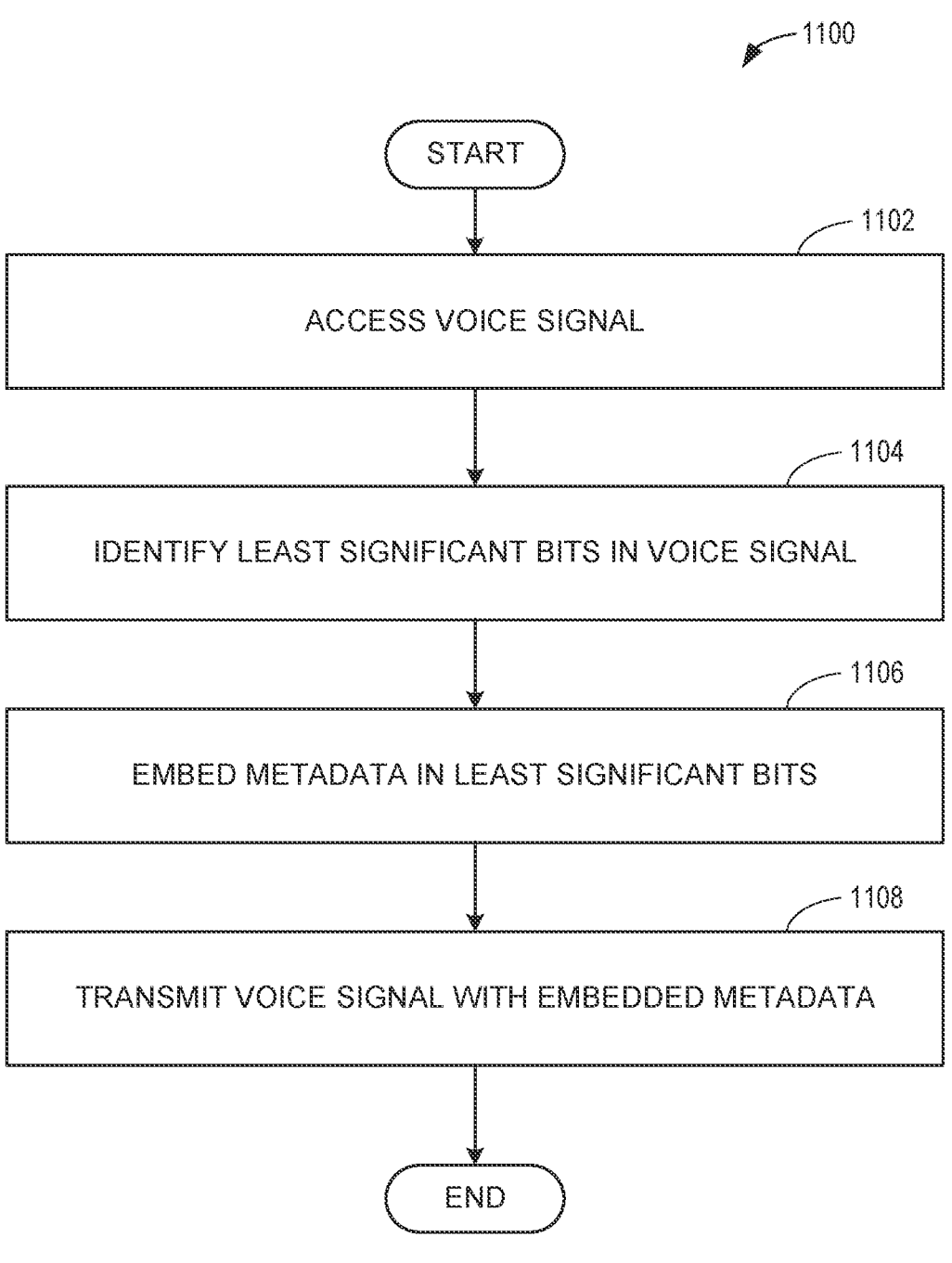
FIG. 11 is a flowchart representative of example machine readable instructions and/or example operations that may be executed, instantiated, and/or performed by example programmable circuitry to implement the user device and/or the service provider circuitry of FIGS. 2-3.

FIG. 11 is a flowchart representative of example machine readable instructions and/or example operations 1100 that may be executed, instantiated, and/or performed by pro-grammable circuitry to embed information in a voice signal while preserving content (e.g., linguistic content) of the voice signal. The example machine-readable instructions and/or the example operations 1100 of FIG. 11 begin at block 1102, at which the user device 110 or the service provider circuitry 300 accesses the voice signal. For example, the microphone 212 can generate the voice signal based on speech from a user. Further, the metadata insertion circuitry 250 can access the generated voice signal.

At block 1104, the user device 110 or the service provider circuitry 300 identifies the least significant bits of the voice signal. In some examples, the metadata insertion circuitry 250 identifies the least significant bits based on an original voice signal recorded by the microphone 212 and a filtered voice signal that the voice signal filter circuitry 220 outputs. For example, the metadata insertion circuitry 250 can iden-tify a string of bits that the voice signal filter circuitry 220 adjusted and, thus, determine that the string of bits does not convey linguistic content. In some examples, the metadata insertion circuitry 250 identifies a predetermined location associated with the least significant bits based on a type of recorded voice signal. For example, the metadata insertion circuitry 250 can determine that a first or last string of bits typically does not convey speech in a certain application such that the first or last string of bits can be overwritten without impacting the content of the voice signal. In some examples, the metadata insertion circuitry 250 analyzes the voice signal to identify a period of silence.

At block 1106, the user device 110 or the service provider circuitry 300 embeds metadata in the identified least significant bits. For example, the metadata insertion circuitry 250 can embed the metadata in the identified least significant bits of the voice signal. In some examples, the metadata is representative of a copyright mark. In some examples, the metadata can provide information that enables the sound conveyed by the signal to be improved. For example, the metadata insertion circuitry 250 can utilize noise modeling techniques to estimate noise parameters in the voice signal. Further, the metadata insertion circuitry 250 can set the metadata (e.g., set the bit values) to be indicative of the noise parameters. In some examples, the metadata is representative of information associated with the user device 110. For example, the metadata can indicate an IMEI of the user device 110, a MAC address of the user device 110, etc. The metadata database 290 can store data that links metadata values (e.g., values of bits in a string) to information that the metadata represents.

At block 1108, the user device 110 or the service provider circuitry 300 transmits the voice signal with the embedded metadata. For example, the metadata insertion circuitry 250 can cause the user device interface circuitry 260 to transmit the voice signal with the embedded metadata to the service provider circuitry 300 and/or another electronic device (e.g., another user device). Additionally or alternatively, the metadata insertion circuitry 250 can cause the service provider interface circuitry 310 to transmit the voice signal with the embedded metadata to the user device 110 and/or to other service provider circuitry 300 (e.g., from the first service provider circuitry 120 to the second service provider circuitry 121).

Figure 12:
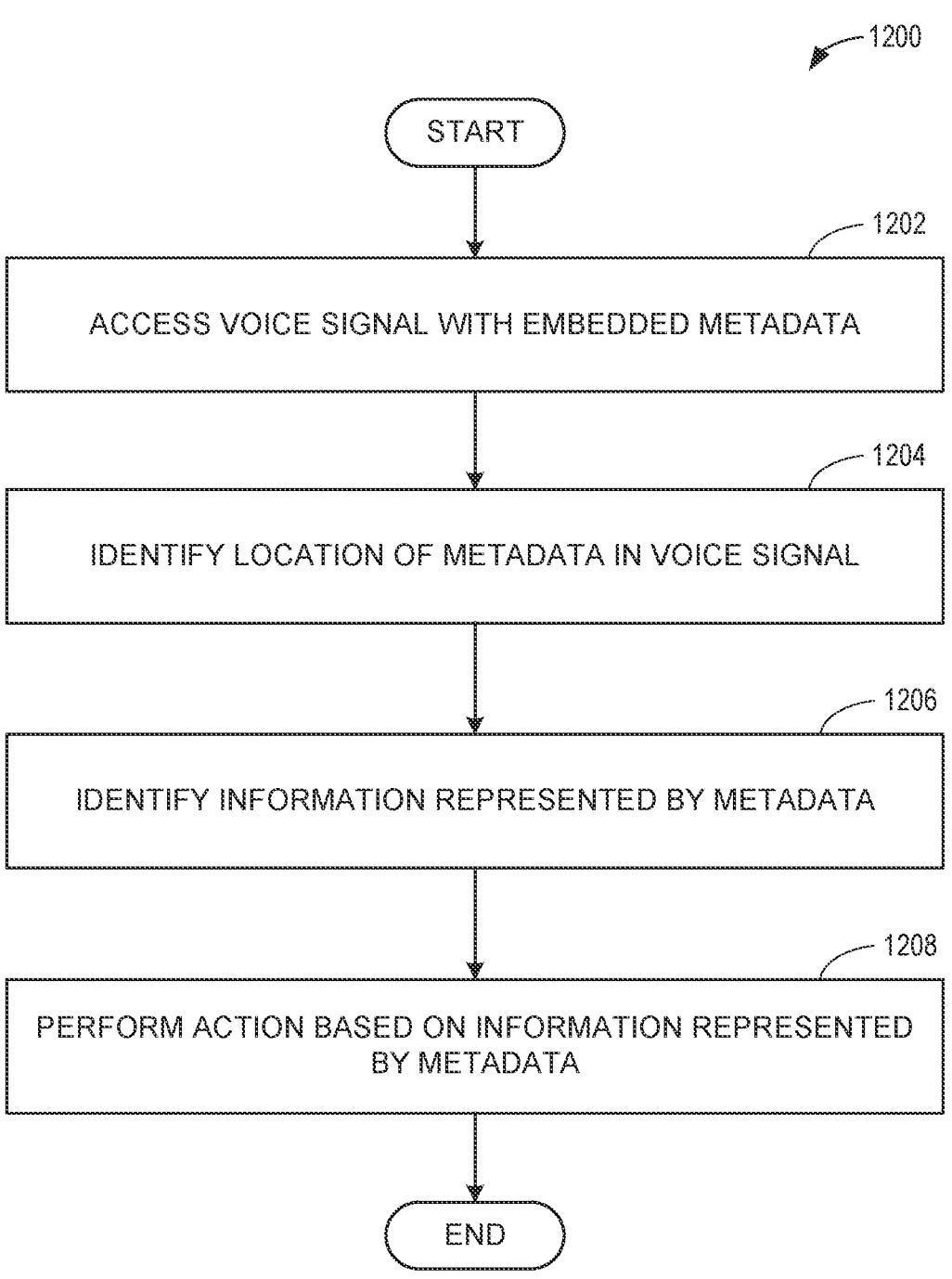
FIG. 12 is a flowchart representative of example machine readable instructions and/or example operations that may be executed, instantiated, and/or performed by example programmable circuitry to implement the user device and/or the service provider circuitry of FIGS. 2-3.

FIG. 12 is a flowchart representative of example machine readable instructions and/or example operations 1200 that may be executed, instantiated, and/or performed by programmable circuitry to extract information embedded within a voice signal. The example machine-readable instructions and/or the example operations 1200 of FIG. 12 begin at block 1202, at which the user device 110 or the service provider circuitry 300 accesses the voice signal with the embedded metadata. For example, the service provider interface circuitry 310 can receive the voice signal with the embedded metadata via the network 130. Alternatively, the user device interface circuitry 260 can receive the voice signal with the embedded metadata via the network 130.

At block 1204, the user device 110 or the service provider circuitry 300 identifies a location of the metadata within the voice signal. For example, the metadata identification circuitry 255 can identify the metadata within the voice signal. In some examples, the voice signal includes one or more embedded signatures (e.g., a signature indicative of beginning of the metadata, a signature indicative of an end of the metadata, etc.) to enable the metadata identification circuitry 255 to identify the location of the metadata in the voice signal. In some examples, the metadata identification circuitry 255 identifies a predetermined metadata location, metadata values indicative of a certain metadata location, and/or a metadata signature via the metadata database 290.

At block 1206, the user device 110 or the service provider circuitry 300 identifies information represented by the metadata. For example, the metadata identification circuitry 255 can identify the copyright mark communicated by the metadata in the voice signal and recognize that the external system is not authorized to present the voice signal. In some examples, the metadata identification circuitry 255 identifies noise parameters associated with the voice signal based on the metadata. In some examples, the metadata identification circuitry 255 identifies information associated with the device (e.g., the user device 110, the service provider circuitry 300, etc.) that produced the voice signal based on the metadata.

At block 1208, the user device 110 or the service provider circuitry 300 performs an action based on the identified information. For example, the metadata identification circuitry 255 can discard the voice signal in response to identifying the metadata indicative of the copyright mark. In some examples, the metadata identification circuitry 255 causes the voice signal to be adjusted based on the noise parameters communicated by the metadata. In some examples, the metadata identification circuitry 255 causes a user or device to be verified based on the metadata. In some examples, the metadata identification circuitry 255 causes data to be stored based on the metadata.

Figure 13:
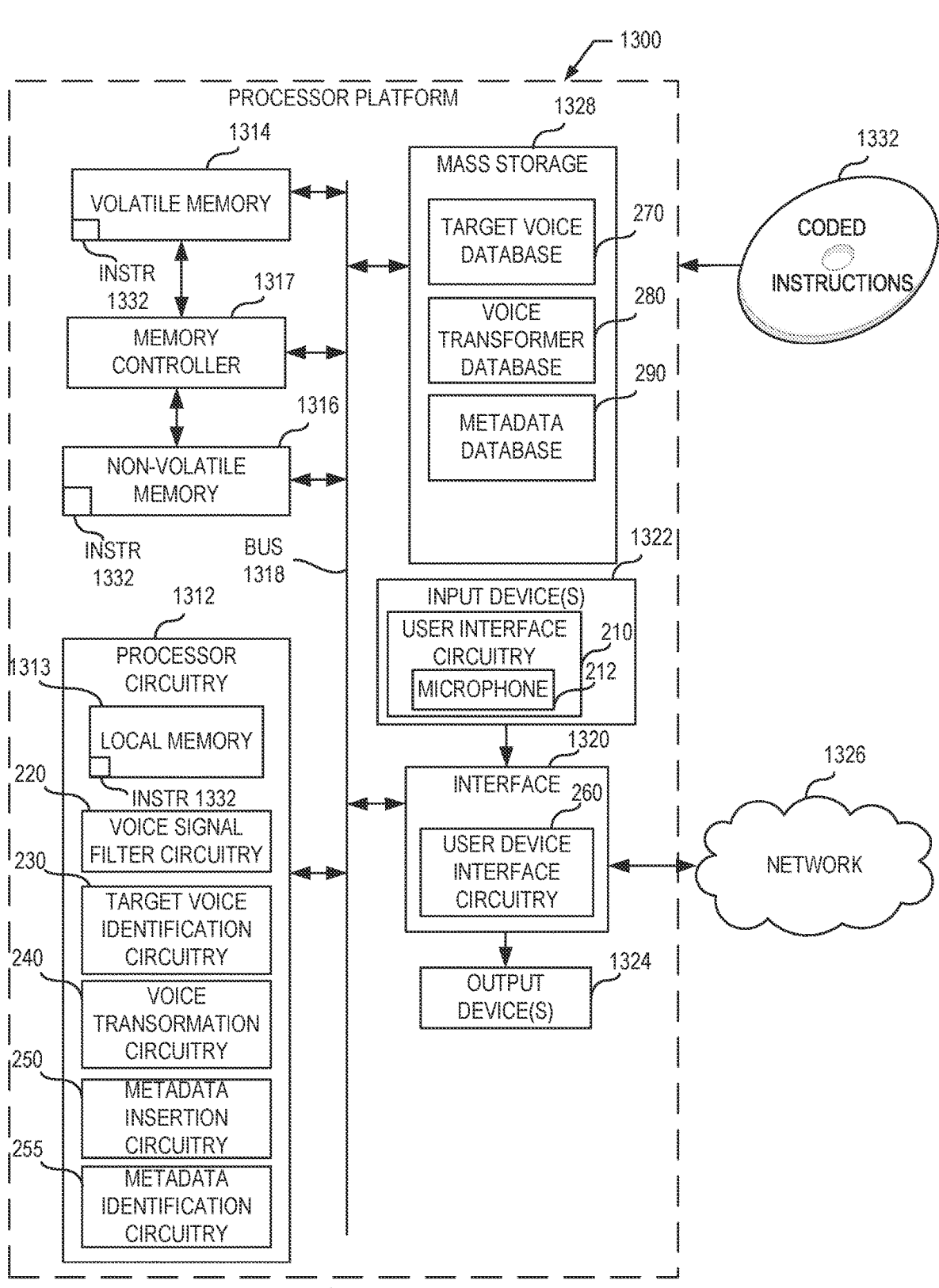
FIG. 13 is a block diagram of an example processing platform including programmable circuitry structured to execute, instantiate, and/or perform the example machine readable instructions and/or perform the example operations of FIGS. 9-12 to implement the user device of FIG. 2.

FIG. 13 is a block diagram of an example programmable circuitry platform 1300 structured to execute and/or instantiate the example machine-readable instructions and/or the example operations of FIGS. 9-12 to implement the user device 110 of FIG. 2. The programmable circuitry platform 1300 can be, for example, a server, a personal computer, a workstation, a self-learning machine (e.g., a neural network), a mobile device (e.g., a cell phone, a smart phone, a tablet such as an iPad™), a personal digital assistant (PDA), an Internet appliance, a DVD player, a CD player, a digital video recorder, a Blu-ray player, a gaming console, a personal video recorder, a set top box, a headset (e.g., an augmented reality (AR) headset, a virtual reality (VR) headset, etc.) or other wearable device, or any other type of computing and/or electronic device.

The programmable circuitry platform 1300 of the illustrated example includes programmable circuitry 1312. The programmable circuitry 1312 of the illustrated example is hardware. For example, the programmable circuitry 1312 can be implemented by one or more integrated circuits, logic circuits, FPGAs, microprocessors, CPUs, GPUs, DSPs, and/or microcontrollers from any desired family or manufacturer. The programmable circuitry 1312 may be implemented by one or more semiconductor based (e.g., silicon based) devices. In this example, the programmable circuitry 1312 implements the voice signal filter circuitry 220, the target voice identification circuitry 230, the voice transformation circuitry 240, the metadata insertion circuitry 250, and the metadata identification circuitry 255.

The programmable circuitry 1312 of the illustrated example includes a local memory 1313 (e.g., a cache, registers, etc.). The programmable circuitry 1312 of the illustrated example is in communication with main memory 1314, 1316, which includes a volatile memory 1314 and a non-volatile memory 1316, by a bus 1318. The volatile memory 1314 may be implemented by Synchronous Dynamic Random Access Memory (SDRAM), Dynamic Random Access Memory (DRAM), RAMBUS® Dynamic Random Access Memory (RDRAM®), and/or any other type of RAM device. The non-volatile memory 1316 may be implemented by flash memory and/or any other desired type of memory device. Access to the main memory 1314, 1316 of the illustrated example is controlled by a memory controller 1317. In some examples, the memory controller 1317 may be implemented by one or more integrated circuits, logic circuits, microcontrollers from any desired family or manufacturer, or any other type of circuitry to manage the flow of data going to and from the main memory 1314, 1316.

The programmable circuitry platform 1300 of the illustrated example also includes interface circuitry 1320. The interface circuitry 1320 may be implemented by hardware in accordance with any type of interface standard, such as an Ethernet interface, a universal serial bus (USB) interface, a Bluetooth® interface, a near field communication (NFC) interface, a Peripheral Component Interconnect (PCI) interface, and/or a Peripheral Component Interconnect Express (PCIe) interface.

In the illustrated example, one or more input devices 1322 are connected to the interface circuitry 1320. The input device(s) 1322 permit(s) a user (e.g., a human user, a machine user, etc.) to enter data and/or commands into the programmable circuitry 1312. The input device(s) 1322 can be implemented by, for example, an audio sensor, a microphone, a camera (still or video), a keyboard, a button, a mouse, a touchscreen, a trackpad, a trackball, an isopoint device, and/or a voice recognition system. In this example, the input device(s) 1322 implements the user interface circuitry 210 and the microphone 212.

One or more output devices 1324 are also connected to the interface circuitry 1320 of the illustrated example. The output device(s) 1324 can be implemented, for example, by display devices (e.g., a light emitting diode (LED), an organic light emitting diode (OLED), a liquid crystal display (LCD), a cathode ray tube (CRT) display, an in-place switching (IPS) display, a touchscreen, etc.), a tactile output device, a printer, and/or speaker. The interface circuitry 1320 of the illustrated example, thus, typically includes a graphics driver card, a graphics driver chip, and/or graphics processor circuitry such as a GPU.

The interface circuitry 1320 of the illustrated example also includes a communication device such as a transmitter, a receiver, a transceiver, a modem, a residential gateway, a wireless access point, and/or a network interface to facilitate exchange of data with external machines (e.g., computing devices of any kind) by a network 1326. The communication can be by, for example, an Ethernet connection, a digital subscriber line (DSL) connection, a telephone line connection, a coaxial cable system, a satellite system, a beyond-line-of-sight wireless system, a line-of-sight wireless system, a cellular telephone system, an optical connection, etc. In this example, the interface circuitry 1320 implements the user device interface circuitry 260.

The programmable circuitry platform 1300 of the illustrated example also includes one or more mass storage discs or devices 1328 to store firmware, software, and/or data. Examples of such mass storage discs or devices 1328 include magnetic storage devices (e.g., floppy disk, drives, HDDs, etc.), optical storage devices (e.g., Blu-ray disks, CDs, DVDs, etc.), RAID systems, and/or solid-state storage discs or devices such as flash memory devices and/or SSDs. In this example, the mass storage disc(s) or device(s) 1328 implements the target voice database 270, the voice transformer database 280, and the metadata database 290.

The machine readable instructions 1332, which may be implemented by the machine readable instructions of FIGS. 9-12, may be stored in the mass storage device 1328, in the volatile memory 1314, in the non-volatile memory 1316, and/or on at least one non-transitory computer readable storage medium such as a CD or DVD which may be removable.

Figure 14:
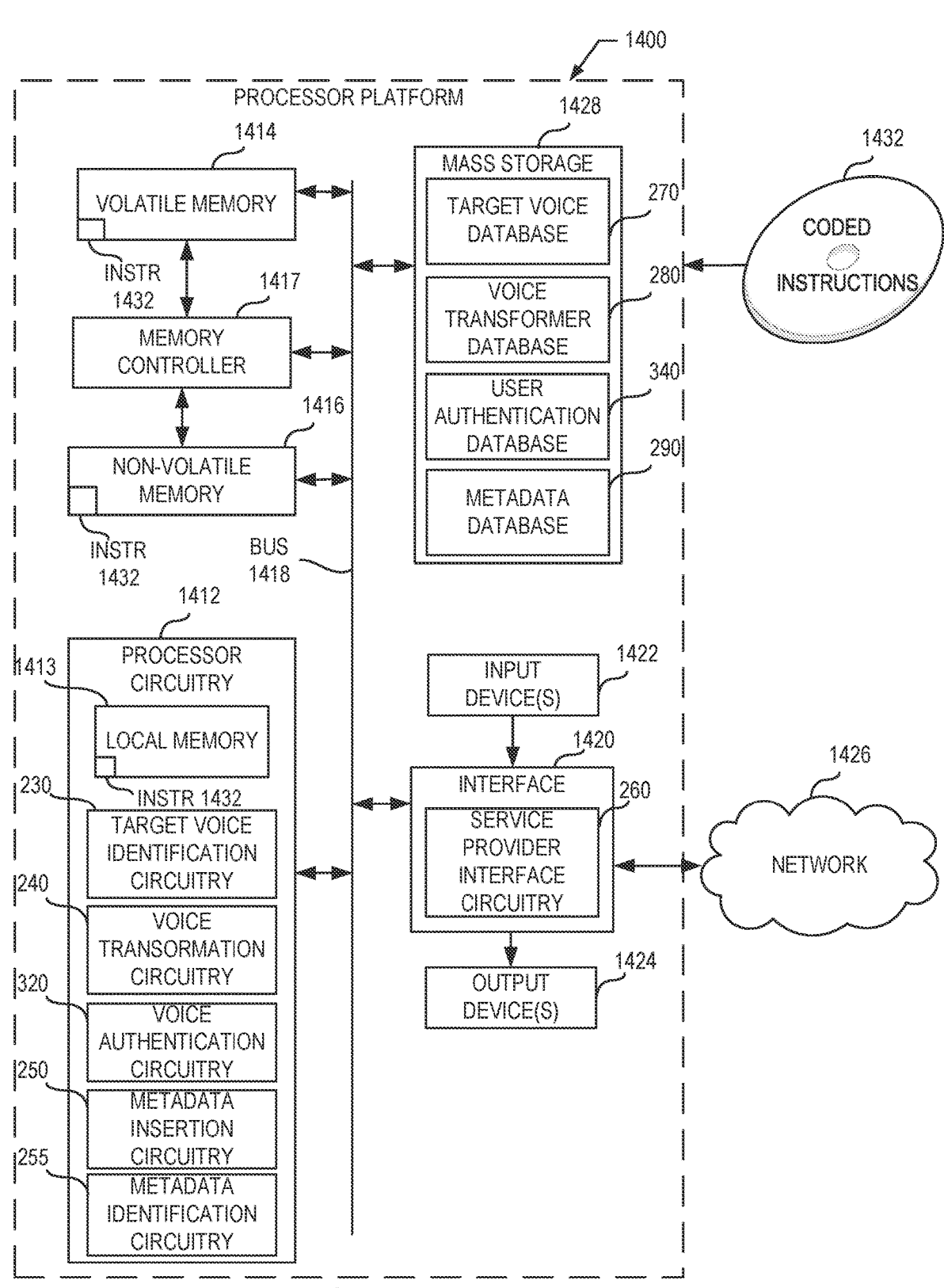
FIG. 14 is a block diagram of an example processing platform including programmable circuitry structured to execute, instantiate, and/or perform the example machine readable instructions and/or perform the example operations of FIGS. 9-12 to implement the service provider circuitry of FIG. 3.

FIG. 14 is a block diagram of an example programmable circuitry platform 1400 structured to execute and/or instantiate the example machine-readable instructions and/or the example operations of FIGS. 9-12 to implement the service provider circuitry 300 of FIG. 3. The programmable circuitry platform 1400 can be, for example, a server, a personal computer, a workstation, a self-learning machine (e.g., a neural network), a mobile device (e.g., a cell phone, a smart phone, a tablet such as an iPad™), a personal digital assistant (PDA), an Internet appliance, a DVD player, a CD player, a digital video recorder, a Blu-ray player, a gaming console, a personal video recorder, a set top box, a headset (e.g., an augmented reality (AR) headset, a virtual reality (VR) headset, etc.) or other wearable device, or any other type of computing and/or electronic device.

The programmable circuitry platform 1400 of the illustrated example includes programmable circuitry 1412. The programmable circuitry 1412 of the illustrated example is hardware. For example, the programmable circuitry 1412 can be implemented by one or more integrated circuits, logic circuits, FPGAs, microprocessors, CPUs, GPUs, DSPs, and/or microcontrollers from any desired family or manufacturer. The programmable circuitry 1412 may be implemented by one or more semiconductor based (e.g., silicon based) devices. In this example, the programmable circuitry 1412 implements the target voice identification circuitry 230, the voice transformation circuitry 240, the voice authentication circuitry 320, the metadata insertion circuitry 250, and the metadata identification circuitry 255.

The programmable circuitry 1412 of the illustrated example includes a local memory 1413 (e.g., a cache, registers, etc.). The programmable circuitry 1412 of the illustrated example is in communication with main memory 1414, 1416, which includes a volatile memory 1414 and a non-volatile memory 1416, by a bus 1418. The volatile memory 1414 may be implemented by Synchronous Dynamic Random Access Memory (SDRAM), Dynamic Random Access Memory (DRAM), RAMBUS® Dynamic Random Access Memory (RDRAM®), and/or any other type of RAM device. The non-volatile memory 1416 may be implemented by flash memory and/or any other desired type of memory device. Access to the main memory 1414, 1416 of the illustrated example is controlled by a memory controller 1417. In some examples, the memory controller 1417 may be implemented by one or more integrated circuits, logic circuits, microcontrollers from any desired family or manufacturer, or any other type of circuitry to manage the flow of data going to and from the main memory 1414, 1416.

The programmable circuitry platform 1400 of the illustrated example also includes interface circuitry 1420. The interface circuitry 1420 may be implemented by hardware in accordance with any type of interface standard, such as an Ethernet interface, a universal serial bus (USB) interface, a Bluetooth® interface, a near field communication (NFC) interface, a Peripheral Component Interconnect (PCI) interface, and/or a Peripheral Component Interconnect Express (PCIe) interface.

In the illustrated example, one or more input devices 1422 are connected to the interface circuitry 1420. The input device(s) 1422 permit(s) a user (e.g., a human user, a machine user, etc.) to enter data and/or commands into the programmable circuitry 1412. The input device(s) 1422 can be implemented by, for example, an audio sensor, a microphone, a camera (still or video), a keyboard, a button, a mouse, a touchscreen, a trackpad, a trackball, an isopoint device, and/or a voice recognition system.

One or more output devices 1424 are also connected to the interface circuitry 1420 of the illustrated example. The output device(s) 1424 can be implemented, for example, by display devices (e.g., a light emitting diode (LED), an organic light emitting diode (OLED), a liquid crystal display (LCD), a cathode ray tube (CRT) display, an in-place switching (IPS) display, a touchscreen, etc.), a tactile output device, a printer, and/or speaker. The interface circuitry 1420 of the illustrated example, thus, typically includes a graphics driver card, a graphics driver chip, and/or graphics processor circuitry such as a GPU.

The interface circuitry 1420 of the illustrated example also includes a communication device such as a transmitter, a receiver, a transceiver, a modem, a residential gateway, a wireless access point, and/or a network interface to facilitate exchange of data with external machines (e.g., computing devices of any kind) by a network 1426. The communication can be by, for example, an Ethernet connection, a digital subscriber line (DSL) connection, a telephone line connection, a coaxial cable system, a satellite system, a beyond-line-of-sight wireless system, a line-of-sight wireless system, a cellular telephone system, an optical connection, etc. In this example, the interface circuitry 1420 implements the service provider interface circuitry 310.

The programmable circuitry platform 1400 of the illustrated example also includes one or more mass storage discs or devices 1428 to store firmware, software, and/or data. Examples of such mass storage discs or devices 1428 include magnetic storage devices (e.g., floppy disk, drives, HDDs, etc.), optical storage devices (e.g., Blu-ray disks, CDs, DVDs, etc.), RAID systems, and/or solid-state storage discs or devices such as flash memory devices and/or SSDs. In this example, the mass storage disc(s) or device(s) implements the target voice database 270, the voice transformer database 280, the user authentication database 340, and the metadata database 290.

The machine readable instructions 1432, which may be implemented by the machine readable instructions of FIGS. 9-12, may be stored in the mass storage device 1428, in the volatile memory 1414, in the non-volatile memory 1416, and/or on at least one non-transitory computer readable storage medium such as a CD or DVD which may be removable.

Figure 15:
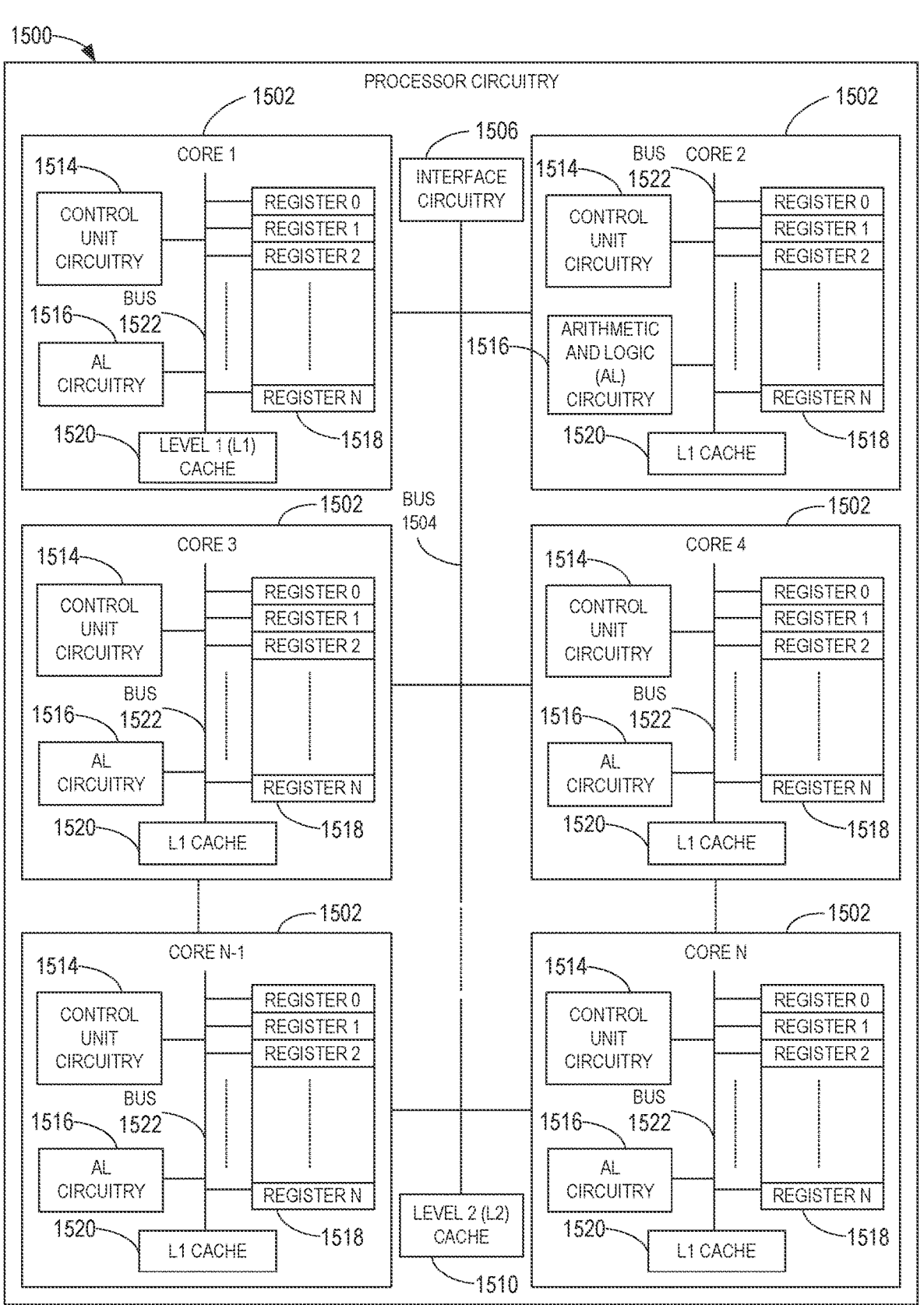
FIG. 15 is a block diagram of an example implementation of the programmable circuitry of FIGS. 13 and/or 14.

FIG. 15 is a block diagram of an example implementation of the programmable circuitry 1312, 1412 of FIGS. 13-14. In this example, the programmable circuitry 1312, 1412 of FIGS. 13-14 is implemented by a microprocessor 1500. For example, the microprocessor 1500 may be a general-purpose microprocessor (e.g., general-purpose microprocessor circuitry). The microprocessor 1500 executes some or all of the machine-readable instructions of the flowcharts of FIGS. 9-12 to effectively instantiate the circuitry of FIGS. 2-3 as logic circuits to perform operations corresponding to those machine readable instructions. In some such examples, the circuitry of FIG. [ER-Diagram] is instantiated by the hardware circuits of the microprocessor 1500 in combination with the machine-readable instructions. For example, the microprocessor 1500 may be implemented by multi-core hardware circuitry such as a CPU, a DSP, a GPU, an XPU, etc. Although it may include any number of example cores 1502 (e.g., 1 core), the microprocessor 1500 of this example is a multi-core semiconductor device including N cores. The cores 1502 of the microprocessor 1500 may operate independently or may cooperate to execute machine readable instructions. For example, machine code corresponding to a firmware program, an embedded software program, or a software program may be executed by one of the cores 1502 or may be executed by multiple ones of the cores 1502 at the same or different times. In some examples, the machine code corresponding to the firmware program, the embedded software program, or the software program is split into threads and executed in parallel by two or more of the cores 1502. The software program may correspond to a portion or all of the machine readable instructions and/or operations represented by the flowcharts of FIGS. 9-12.

The cores 1502 may communicate by a first example bus 1504. In some examples, the first bus 1504 may be implemented by a communication bus to effectuate communication associated with one(s) of the cores 1502. For example, the first bus 1504 may be implemented by at least one of an Inter-Integrated Circuit (I2C) bus, a Serial Peripheral Interface (SPI) bus, a PCI bus, or a PCIe bus. Additionally or alternatively, the first bus 1504 may be implemented by any other type of computing or electrical bus. The cores 1502 may obtain data, instructions, and/or signals from one or more external devices by example interface circuitry 1506. The cores 1502 may output data, instructions, and/or signals to the one or more external devices by the interface circuitry 1506. Although the cores 1502 of this example include example local memory 1520 (e.g., Level 1 (L1) cache that may be split into an L1 data cache and an L1 instruction cache), the microprocessor 1500 also includes example shared memory 1510 that may be shared by the cores (e.g., Level 2 (L2 cache)) for high-speed access to data and/or instructions. Data and/or instructions may be transferred (e.g., shared) by writing to and/or reading from the shared memory 1510. The local memory 1520 of each of the cores 1502 and the shared memory 1510 may be part of a hierarchy of storage devices including multiple levels of cache memory and the main memory (e.g., the main memory 1314, 1316, 1414, 1416 of FIGS. 13-14). Typically, higher levels of memory in the hierarchy exhibit lower access time and have smaller storage capacity than lower levels of memory. Changes in the various levels of the cache hierarchy are managed (e.g., coordinated) by a cache coherency policy.

Each core 1502 may be referred to as a CPU, DSP, GPU, etc., or any other type of hardware circuitry. Each core 1502 includes control unit circuitry 1514, arithmetic and logic (AL) circuitry (sometimes referred to as an ALU) 1516, a plurality of registers 1518, the local memory 1520, and a second example bus 1522. Other structures may be present. For example, each core 1502 may include vector unit circuitry, single instruction multiple data (SIMD) unit circuitry, load/store unit (LSU) circuitry, branch/jump unit circuitry, floating-point unit (FPU) circuitry, etc. The control unit circuitry 1514 includes semiconductor-based circuits structured to control (e.g., coordinate) data movement within the corresponding core 1502. The AL circuitry 1516 includes semiconductor-based circuits structured to perform one or more mathematic and/or logic operations on the data within the corresponding core 1502. The AL circuitry 1516 of some examples performs integer based operations. In other examples, the AL circuitry 1516 also performs floating-point operations. In yet other examples, the AL circuitry 1516 may include first AL circuitry that performs integer-based operations and second AL circuitry that performs floating-point operations. In some examples, the AL circuitry 1516 may be referred to as an Arithmetic Logic Unit (ALU).

The registers 1518 are semiconductor-based structures to store data and/or instructions such as results of one or more of the operations performed by the AL circuitry 1516 of the corresponding core 1502. For example, the registers 1518 may include vector register(s), SIMD register(s), general-purpose register(s), flag register(s), segment register(s), machine-specific register(s), instruction pointer register(s), control register(s), debug register(s), memory management register(s), machine check register(s), etc. The registers 1518 may be arranged in a bank as shown in FIG. 15. Alternatively, the registers 1518 may be organized in any other arrangement, format, or structure, such as by being distributed throughout the core 1502 to shorten access time. The second bus 1522 may be implemented by at least one of an I2C bus, a SPI bus, a PCI bus, or a PCIe bus.

Each core 1502 and/or, more generally, the microprocessor 1500 may include additional and/or alternate structures to those shown and described above. For example, one or more clock circuits, one or more power supplies, one or more power gates, one or more cache home agents (CHAs), one or more converged/common mesh stops (CMSs), one or more shifters (e.g., barrel shifter(s)) and/or other circuitry may be present. The microprocessor 1500 is a semiconductor device fabricated to include many transistors interconnected to implement the structures described above in one or more integrated circuits (ICs) contained in one or more packages.

The microprocessor 1500 may include and/or cooperate with one or more accelerators (e.g., acceleration circuitry, hardware accelerators, etc.). In some examples, accelerators are implemented by logic circuitry to perform certain tasks more quickly and/or efficiently than can be done by a general-purpose processor. Examples of accelerators include ASICs and FPGAs such as those discussed herein. A GPU, DSP and/or other programmable device can also be an accelerator. Accelerators may be on-board the microprocessor 1500, in the same chip package as the microprocessor 1500 and/or in one or more separate packages from the microprocessor 1500.

Figure 16:
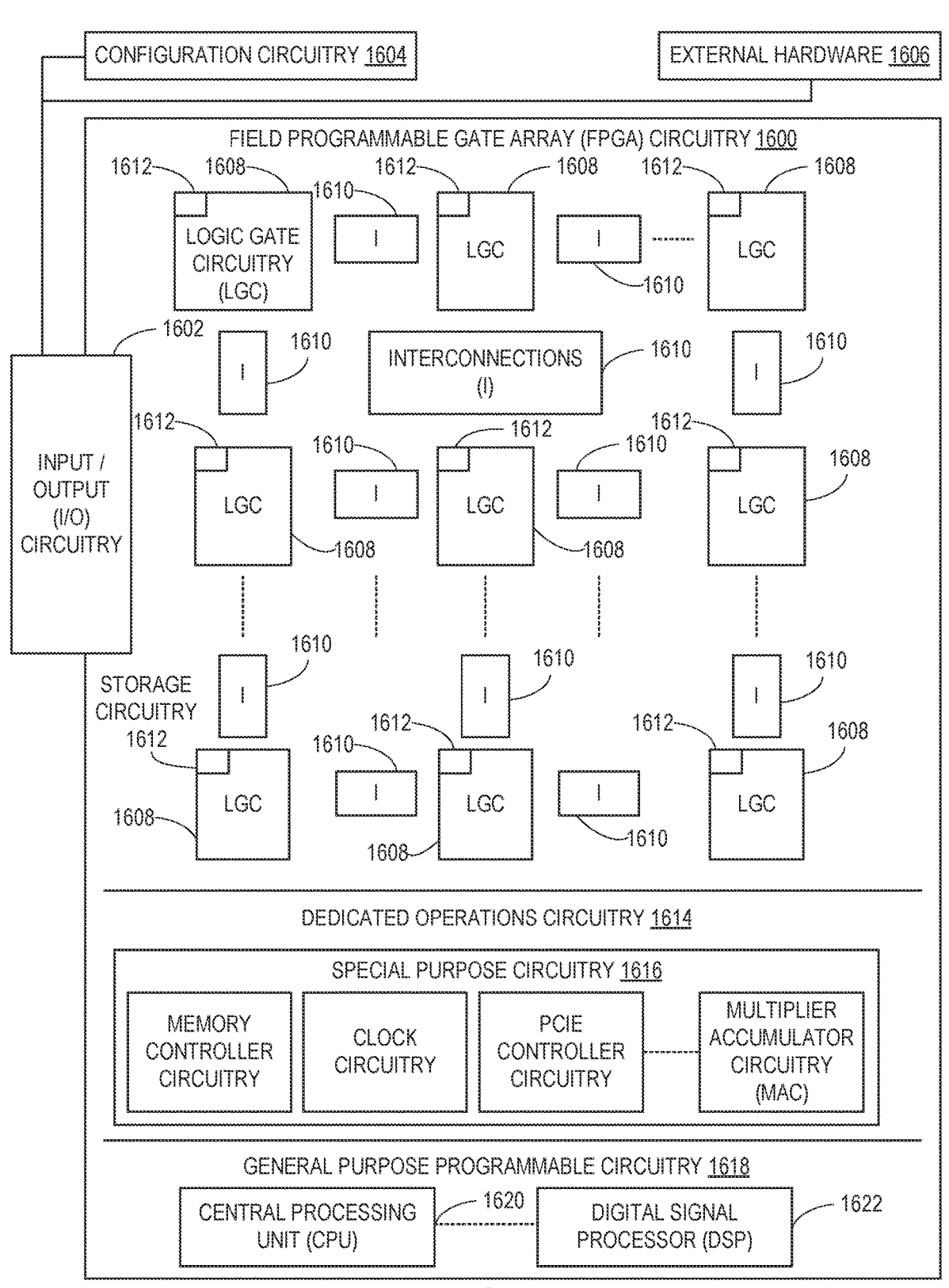
FIG. 16 is a block diagram of another example implementation of the programmable circuitry of FIGS. 13 and/or 14.

FIG. 16 is a block diagram of another example implementation of the programmable circuitry 1312, 1412 of FIGS. 13-14. In this example, the programmable circuitry 1312, 1412 is implemented by FPGA circuitry 1600. For example, the FPGA circuitry 1600 may be implemented by an FPGA. The FPGA circuitry 1600 can be used, for example, to perform operations that could otherwise be performed by the example microprocessor 1500 of FIG. 15 executing corresponding machine readable instructions. However, once configured, the FPGA circuitry 1600 instantiates the operations and/or functions corresponding to the machine readable instructions in hardware and, thus, can often execute the operations/functions faster than they could be performed by a general-purpose microprocessor executing the corresponding software.

More specifically, in contrast to the microprocessor 1500 of FIG. 15 described above (which is a general purpose device that may be programmed to execute some or all of the machine readable instructions represented by the flowcharts of FIGS. 9-12 but whose interconnections and logic circuitry are fixed once fabricated), the FPGA circuitry 1600 of the example of FIG. 16 includes interconnections and logic circuitry that may be configured, structured, programmed, and/or interconnected in different ways after fabrication to instantiate, for example, some or all of the operations/functions corresponding to the machine readable instructions represented by the flowcharts of FIGS. 9-12. In particular, the FPGA circuitry 1600 may be thought of as an array of logic gates, interconnections, and switches. The switches can be programmed to change how the logic gates are interconnected by the interconnections, effectively forming one or more dedicated logic circuits (unless and until the FPGA circuitry 1600 is reprogrammed). The configured logic circuits enable the logic gates to cooperate in different ways to perform different operations on data received by input circuitry. Those operations may correspond to some or all of the instructions (e.g., the software and/or firmware) represented by the flowcharts of FIGS. 9-12. As such, the FPGA circuitry 1600 may be configured and/or structured to effectively instantiate some or all of the operations/functions corresponding to the machine readable instructions of the flowcharts of FIGS. 9-12 as dedicated logic circuits to perform the operations/functions corresponding to those software instructions in a dedicated manner analogous to an ASIC. Therefore, the FPGA circuitry 1600 may perform the operations/functions corresponding to the some or all of the machine readable instructions of FIGS. 9-12 faster than the general-purpose microprocessor can execute the same.

In the example of FIG. 16, the FPGA circuitry 1600 is configured and/or structured in response to being programmed (and/or reprogrammed one or more times) based on a binary file. In some examples, the binary file may be compiled and/or generated based on instructions in a hardware description language (HDL) such as Lucid, Very High Speed Integrated Circuits (VHSIC) Hardware Description Language (VHDL), or Verilog. For example, a user (e.g., a human user, a machine user, etc.) may write code or a program corresponding to one or more operations/functions in an HDL; the code/program may be translated into a low-level language as needed; and the code/program (e.g., the code/program in the low-level language) may be converted (e.g., by a compiler, a software application, etc.) into the binary file. In some examples, the FPGA circuitry 1600 of FIG. 16 may access and/or load the binary file to cause the FPGA circuitry 1600 of FIG. 16 to be configured and/or structured to perform the one or more operations/functions. For example, the binary file may be implemented by a bit stream (e.g., one or more computer-readable bits, one or more machine-readable bits, etc.), data (e.g., computer-readable data, machine-readable data, etc.), and/or machine-readable instructions accessible to the FPGA circuitry 1600 of FIG. 16 to cause configuration and/or structuring of the FPGA circuitry 1600 of FIG. 16, or portion(s) thereof.

In some examples, the binary file is compiled, generated, transformed, and/or otherwise output from a uniform software platform utilized to program FPGAs. For example, the uniform software platform may translate first instructions (e.g., code or a program) that correspond to one or more operations/functions in a high-level language (e.g., C, C++, Python, etc.) into second instructions that correspond to the one or more operations/functions in an HDL. In some such examples, the binary file is compiled, generated, and/or otherwise output from the uniform software platform based on the second instructions. In some examples, the FPGA circuitry 1600 of FIG. 16 may access and/or load the binary file to cause the FPGA circuitry 1600 of FIG. 16 to be configured and/or structured to perform the one or more operations/functions. For example, the binary file may be implemented by a bit stream (e.g., one or more computer-readable bits, one or more machine-readable bits, etc.), data (e.g., computer-readable data, machine-readable data, etc.), and/or machine-readable instructions accessible to the FPGA circuitry 1600 of FIG. 16 to cause configuration and/or structuring of the FPGA circuitry 1600 of FIG. 16, or portion(s) thereof.

The FPGA circuitry 1600 of FIG. 16, includes example input/output (I/O) circuitry 1602 to obtain and/or output data to/from example configuration circuitry 1604 and/or external hardware 1606. For example, the configuration circuitry 1604 may be implemented by interface circuitry that may obtain a binary file, which may be implemented by a bit stream, data, and/or machine-readable instructions, to configure the FPGA circuitry 1600, or portion(s) thereof. In some such examples, the configuration circuitry 1604 may obtain the binary file from a user, a machine (e.g., hardware circuitry (e.g., programmable or dedicated circuitry) that may implement an Artificial Intelligence/Machine Learning (AI/ML) model to generate the binary file), etc., and/or any combination(s) thereof). In some examples, the external hardware 1606 may be implemented by external hardware circuitry. For example, the external hardware 1606 may be implemented by the microprocessor 1500 of FIG. 15.

The FPGA circuitry 1600 also includes an array of example logic gate circuitry 1608, a plurality of example configurable interconnections 1610, and example storage circuitry 1612. The logic gate circuitry 1608 and the configurable interconnections 1610 are configurable to instantiate one or more operations/functions that may correspond to at least some of the machine readable instructions of FIGS. 9-12 and/or other desired operations. The logic gate circuitry 1608 shown in FIG. 16 is fabricated in blocks or groups. Each block includes semiconductor-based electrical structures that may be configured into logic circuits. In some examples, the electrical structures include logic gates (e.g., And gates, Or gates, Nor gates, etc.) that provide basic building blocks for logic circuits. Electrically controllable switches (e.g., transistors) are present within each of the logic gate circuitry 1608 to enable configuration of the electrical structures and/or the logic gates to form circuits to perform desired operations/functions. The logic gate circuitry 1608 may include other electrical structures such as look-up tables (LUTs), registers (e.g., flip-flops or latches), multiplexers, etc.

The configurable interconnections 1610 of the illustrated example are conductive pathways, traces, vias, or the like that may include electrically controllable switches (e.g., transistors) whose state can be changed by programming (e.g., using an HDL instruction language) to activate or deactivate one or more connections between one or more of the logic gate circuitry 1608 to program desired logic circuits.

The storage circuitry 1612 of the illustrated example is structured to store result(s) of the one or more of the operations performed by corresponding logic gates. The storage circuitry 1612 may be implemented by registers or the like. In the illustrated example, the storage circuitry 1612 is distributed amongst the logic gate circuitry 1608 to facilitate access and increase execution speed.

The example FPGA circuitry 1600 of FIG. 16 also includes example dedicated operations circuitry 1614. In this example, the dedicated operations circuitry 1614 includes special purpose circuitry 1616 that may be invoked to implement commonly used functions to avoid the need to program those functions in the field. Examples of such special purpose circuitry 1616 include memory (e.g., DRAM) controller circuitry, PCIe controller circuitry, clock circuitry, transceiver circuitry, memory, and multiplier-accumulator circuitry. Other types of special purpose circuitry may be present. In some examples, the FPGA circuitry 1600 may also include example general purpose programmable circuitry 1618 such as an example CPU 1620 and/or an example DSP 1622. Other general purpose programmable circuitry 1618 may additionally or alternatively be present such as a GPU, an XPU, etc., that can be programmed to perform other operations.

Although FIGS. 15 and 16 illustrate two example implementations of the programmable circuitry 1312, 1412 of FIGS. 13-14, many other approaches are contemplated. For example, FPGA circuitry may include an on-board CPU, such as one or more of the example CPU 1620 of FIG. 15. Therefore, the programmable circuitry 1312, 1412 of FIGS. 13-14 may additionally be implemented by combining at least the example microprocessor 1500 of FIG. 15 and the example FPGA circuitry 1600 of FIG. 16. In some such hybrid examples, one or more cores 1502 of FIG. 15 may execute a first portion of the machine readable instructions represented by the flowcharts of FIGS. 9-12 to perform first operation(s)/function(s), the FPGA circuitry 1600 of FIG. 16 may be configured and/or structured to perform second operation(s)/function(s) corresponding to a second portion of the machine readable instructions represented by the flowcharts of FIGS. 9-12, and/or an ASIC may be configured and/or structured to perform third operation(s)/function(s) corresponding to a third portion of the machine readable instructions represented by the flowcharts of FIGS. 9-12.

It should be understood that some or all of the circuitry of FIGS. 2-3 may, thus, be instantiated at the same or different times. For example, same and/or different portion(s) of the microprocessor 1500 of FIG. 15 may be programmed to execute portion(s) of machine-readable instructions at the same and/or different times. In some examples, same and/or different portion(s) of the FPGA circuitry 1600 of FIG. 16 may be configured and/or structured to perform operations/functions corresponding to portion(s) of machine-readable instructions at the same and/or different times.

In some examples, some or all of the circuitry of FIGS. 2-3 may be instantiated, for example, in one or more threads executing concurrently and/or in series. For example, the microprocessor 1500 of FIG. 15 may execute machine readable instructions in one or more threads executing concurrently and/or in series. In some examples, the FPGA circuitry 1600 of FIG. 16 may be configured and/or structured to carry out operations/functions concurrently and/or in series. Moreover, in some examples, some or all of the circuitry of FIGS. 2-3 may be implemented within one or more virtual machines and/or containers executing on the microprocessor 1500 of FIG. 15.

In some examples, the programmable circuitry 1312, 1412 of FIGS. 13-14 may be in one or more packages. For example, the microprocessor 1500 of FIG. 15 and/or the FPGA circuitry 1600 of FIG. 16 may be in one or more packages. In some examples, an XPU may be implemented by the programmable circuitry 1312, 1412 of FIGS. 13-14, which may be in one or more packages. For example, the XPU may include a CPU (e.g., the microprocessor 1500 of FIG. 15, the CPU 1620 of FIG. 16, etc.) in one package, a DSP (e.g., the DSP 1622 of FIG. 16) in another package, a GPU in yet another package, and an FPGA (e.g., the FPGA circuitry 1600 of FIG. 16) in still yet another package.

Figure 17:
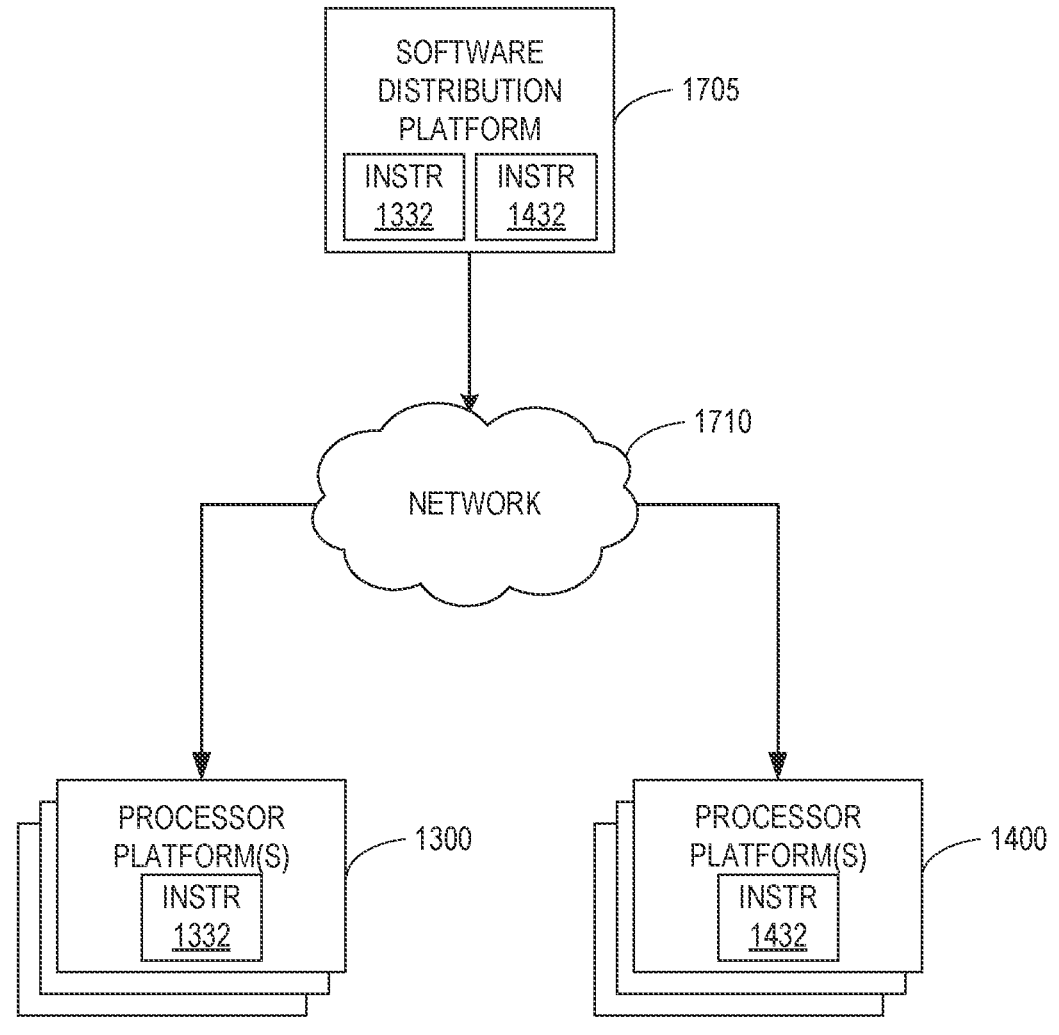
FIG. 17 is a block diagram of an example software/firmware/instructions distribution platform (e.g., one or more servers) to distribute software, instructions, and/or firmware (e.g., corresponding to the example machine readable instructions of FIGS. 9-12) to client devices associated with end users and/or consumers (e.g., for license, sale, and/or use), retailers (e.g., for sale, re-sale, license, and/or sub-license), and/or original equipment manufacturers (OEMs) (e.g., for inclusion in products to be distributed to, for example, retailers and/or to other end users such as direct buy customers).

A block diagram illustrating an example software distribution platform 1705 to distribute software such as the example machine readable instructions 1332, 1432 of FIGS. 13-14 to other hardware devices (e.g., hardware devices owned and/or operated by third parties from the owner and/or operator of the software distribution platform) is illustrated in FIG. 17. The example software distribution platform 1705 may be implemented by any computer server, data facility, cloud service, etc., capable of storing and transmitting software to other computing devices. The third parties may be customers of the entity owning and/or operating the software distribution platform 1705. For example, the entity that owns and/or operates the software distribution platform 1705 may be a developer, a seller, and/or a licensor of software such as the example machine readable instructions 1332, 1432 of FIGS. 13-14. The third parties may be consumers, users, retailers, OEMs, etc., who purchase and/or license the software for use and/or re-sale and/or sub-licensing. In the illustrated example, the software distribution platform 1705 includes one or more servers and one or more storage devices. The storage devices store the machine readable instructions 1332, 1432, which may correspond to the example machine readable instructions of FIGS. 9-12, as described above. The one or more servers of the example software distribution platform 1705 are in communication with an example network 1710, which may correspond to any one or more of the Internet and/or any of the example networks described above. In some examples, the one or more servers are responsive to requests to transmit the software to a requesting party as part of a commercial transaction. Payment for the delivery, sale, and/or license of the software may be handled by the one or more servers of the software distribution platform and/or by a third party payment entity. The servers enable purchasers and/or licensors to download the machine readable instructions 1332, 1432 from the software distribution platform 1705. For example, the software, which may correspond to the example machine readable instructions of FIG. 9-12, may be downloaded to the example programmable circuitry platform 1300, 1400, which is to execute the machine readable instructions 1332, 1432 to implement the user device 110 and/or the service provider circuitry 300. In some examples, one or more servers of the software distribution platform 1705 periodically offer, transmit, and/or force updates to the software (e.g., the example machine readable instructions 1332, 1432 of FIGS. 13-14) to ensure improvements, patches, updates, etc., are distributed and applied to the software at the end user devices. Although referred to as software above, the distributed "software" could alternatively be firmware.

From the foregoing, it will be appreciated that example systems, apparatus, articles of manufacture, and methods have been disclosed that enable user authentication using a transformed voice to improve the security of accounts/services that utilize voice authentication to verify the identity of a user.

Example methods, apparatus, systems, and articles of manufacture for voice transformation, authentication, and metadata communication are disclosed herein. Further examples and combinations thereof include the following:

Example 1 includes an apparatus to authenticate a user requesting access to an account comprising interface circuitry, machine readable instructions, and programmable circuitry to at least one of instantiate or execute the machine readable instructions to identify an enrollment voice associated with the account, a first voice transformation applied to a first voice input to produce the enrollment voice, the first voice transformation to cause the enrollment voice to include first voice-specific features different from second voice-specific features of the first voice input, access a transformed voice associated with a second voice input provided in association with a request to access the account from a user device, the first voice transformation or a second voice transformation applied to the second voice input to produce the transformed voice, the first voice transformation or the second voice transformation to cause the transformed voice to have third voice-specific features different from fourth voice-specific features of the second voice input, provide the user device access to the account when the first voice-specific features match the third voice-specific features, and deny the user device access to the account when the first voice-specific features do not match the third voice-specific features.

Example 2 includes the apparatus of example 1, wherein the programmable circuitry is to determine whether to apply the first voice transformation or the second voice transformation to the second voice input based on at least one of information associated with a device that provided the request or an indication provided by the user requesting access to the account at the user device.

Example 3 includes the apparatus of example 1, wherein the first voice transformation is applied to the second voice input to produce the transformed voice, and wherein the programmable circuitry is to adjust the second voice input based on a relationship between the first voice input and a target voice when applying the first voice transformation.

Example 4 includes the apparatus of example 3, wherein the programmable circuitry is to map the second voice-specific features to the first voice-specific features to develop the first voice transformation.

Example 5 includes the apparatus of example 3, wherein the programmable circuitry is to cause the first voice transformation to preserve linguistic content of the second voice input.

Example 6 includes the apparatus of example 1, wherein the voice-specific features include mel-frequency cepstral coefficients.

Example 7 includes the apparatus of example 1, wherein the enrollment voice is a first enrollment voice, the account is a first account, the transformed voice is a first transformed voice, and the user device is a first user device, and wherein the programmable circuitry is to identify a second enrollment voice associated with a second account, the second voice transformation applied to a third voice input to produce the second enrollment voice, access a second transformed voice associated with a third voice input provided in association with a request to access the second account from a second user device, determine whether to provide the second user device access to the second account based on the second enrollment voice and the second transformed voice.

Example 8 includes a non-transitory machine readable storage medium comprising instructions to cause programmable circuitry to at least associate an enrollment voice with an account, a first voice transformation applied to a first voice input to produce the enrollment voice, the first voice transformation to cause the enrollment voice to include first voice-specific features different from second voice-specific features of the first voice input, access a transformed voice associated with a second voice input provided in association with a request to access the account from a user device, the first voice transformation or a second voice transformation applied to the second voice input to produce the transformed voice, the first voice transformation or the second voice transformation to cause the transformed voice to have third voice-specific features different from fourth voice-specific features of the second voice input, and determine whether to provide the user device access to the account based on the first voice-specific features and the third voice-specific features.

Example 9 includes the non-transitory machine readable storage medium of example 8, wherein the instructions are to cause the programmable circuitry to determine whether to apply the first voice transformation or the second voice transformation to the second voice input based on at least one of information associated with a device that provided the request or an indication provided by the user requesting access to the account at the user device.

Example 10 includes the non-transitory machine readable storage medium of example 8, wherein the first voice transformation is applied to the second voice input to produce the transformed voice, and wherein the instructions are to cause the programmable circuitry to adjust the second voice input based on a relationship between the first voice input and a target voice when applying the first voice transformation.

Example 11 includes the non-transitory machine readable storage medium of example 10, wherein the instructions are to cause the programmable circuitry to map the second voice-specific features to the first voice-specific features to develop the first voice transformation.

Example 12 includes the non-transitory machine readable storage medium of example 10, wherein the instructions are to cause the programmable circuitry to cause the first voice transformation to preserve linguistic content of the second voice input.

Example 13 includes the non-transitory machine readable storage medium of example 8, wherein the voice-specific features include mel-frequency cepstral coefficients.

Example 14 includes the non-transitory machine readable storage medium of example 8, wherein the enrollment voice is a first enrollment voice, the account is a first account, the transformed voice is a first transformed voice, and the user device is a first user device, and wherein the instructions are to cause the programmable circuitry to identify a second enrollment voice associated with a second account, the second voice transformation applied to a third voice input to produce the second enrollment voice, access a second transformed voice associated with a third voice input provided in association with a request to access the second account from a second user device, and determine whether to provide the second user device access to the second account based on the second enrollment voice and the second transformed voice.

Example 15 includes a method comprising associating an enrollment voice with an account, a first voice transformation applied to a first voice input to produce the enrollment voice, the first voice transformation to cause the enrollment voice to include first voice-specific features different from second voice-specific features of the first voice input, accessing a transformed voice associated with a second voice input provided in association with a request to access the account from a user device, the first voice transformation or a second voice transformation applied to the second voice input to produce the transformed voice, the first voice transformation or the second voice transformation to cause the transformed voice to have third voice-specific features different from fourth voice-specific features of the second voice input, and determining whether to provide the user device access to the account based on the first voice-specific features and the third voice-specific features.

Example 16 includes the method of example 15, further including determining whether to apply the first voice transformation or the second voice transformation to the second voice input based on at least one of information associated with a device that provided the request or an indication provided by the user requesting access to the account at the user device.

Example 17 includes the method of example 15, wherein the first voice transformation is applied to the second voice input to produce the transformed voice, and further including adjusting the second voice input based on a relationship between the first voice input and a target voice when applying the first voice transformation.

Example 18 includes the method of example 17, further including mapping the second voice-specific features to the first voice-specific features to develop the first voice transformation.

Example 19 includes the method of example 17, further including preserving linguistic content of the second voice input when applying the first voice transformation.

Example 20 includes the method of example 15, wherein the enrollment voice is a first enrollment voice, the account is a first account, the transformed voice is a first transformed voice, and the user device is a first user device, and further including identifying a second enrollment voice associated with a second account, the second voice transformation applied to a third voice input to produce the second enrollment voice, accessing a second transformed voice associated with a third voice input provided in association with a request to access the second account from a second user device, and determining whether to provide the second user device access to the second account based on the second enrollment voice and the second transformed voice.

Example 21 includes a system to authenticate a user requesting access to an account comprising interface circuitry, machine readable instructions, and programmable circuitry to at least one of instantiate or execute the machine readable instructions to access a first voice signal from a user, transform the first voice signal to obtain a first transformed voice signal, associate the first transformed voice signal with the account to enroll the user, receive a request to access the account, access a second voice signal associated with the request, transform the second voice signal to obtain a second transformed voice signal, and determine whether the request is authorized based on the first transformed voice signal and the second transformed voice signal.

Example 22 includes an apparatus to authenticate a user comprising interface circuitry, machine readable instructions, and programmable circuitry to at least one of instantiate or execute the machine readable instructions to identify an account to which the user requests access, identify an enrollment voice associated with the account, access a voice input from the user, generate a transformed voice based on the voice input and a voice transformer, compare the transformed voice to the enrollment voice, and provide the user access to the account when the transformed voice matches the enrollment voice.

Example 23 includes an apparatus to authenticate a user comprising interface circuitry, machine readable instructions, and programmable circuitry to at least one of instantiate or execute the machine readable instructions to identify an account to which the user requests access, access a voice input from the user, transform the voice input from the user using a voice transformer, transmit the transformed voice to a service provider associated with the account, and receive access to the account when the transformed voice matches an enrollment voice associated with the account.

The following claims are hereby incorporated into this Detailed Description by this reference. Although certain example systems, apparatus, articles of manufacture, and methods have been disclosed herein, the scope of coverage of this patent is not limited thereto. On the contrary, this patent covers all systems, apparatus, articles of manufacture, and methods fairly falling within the scope of the claims of this patent.

What is claimed is:

1. An apparatus, to authentic a user device requesting access to an account, comprising:

interface circuitry;

machine readable instructions; and programmable circuitry to at least one of instantiate or execute the machine readable instructions to:

identify an enrollment voice associated with the account, a first voice transformation applied to a first voice input to produce the enrollment voice, the first voice transformation to cause the enrollment voice to include first voice-specific features different from second voice-specific features of the first voice input;

access a transformed voice associated with a second voice input provided in association with a request to access the account from the user device, the first voice transformation or a second voice transformation applied to the second voice input to produce the transformed voice, the first voice transformation or the second voice transformation to cause the transformed voice to have third voice-specific features different from fourth voice-specific features of the second voice input, the second voice input adjusted based on a relationship between the first voice input and a target voice when applying the first voice transformation to obtain the transformed voice, the target voice different than the transformed voice and the enrollment voice;

provide the user device access to the account when the first voice-specific features match the third voice-specific features; and deny the user device access to the account when the first voice-specific features do not match the third voice-specific features.

2. The apparatus of claim 1, wherein the programmable circuitry is to determine whether to apply the first voice transformation or the second voice transformation to the second voice input based on at least one of information associated with the user device that provided the request or an indication provided by a user requesting access to the account at the user device.

3. The apparatus of claim 1, wherein the programmable circuitry is to map the second voice-specific features to the first voice-specific features to develop the first voice transformation.

4. The apparatus of claim 1, wherein the programmable circuitry is to cause the first voice transformation to preserve linguistic content of the second voice input.

5. The apparatus of claim 1, wherein the first voice-specific features, the second voice-specific features, the third voice-specific features, and the fourth voice-specific features include at least one of mel-frequency cepstral coefficients, perceptual linear prediction coefficients, i-vectors, or x-vectors.

6. The apparatus of claim 1, wherein the enrollment voice is a first enrollment voice, the account is a first account, the transformed voice is a first transformed voice, and the user device is a first user device, and wherein the programmable circuitry is to:

identify a second enrollment voice associated with a second account, the second voice transformation applied to a third voice input to produce the second enrollment voice;

access a second transformed voice associated with a third voice input provided in association with a request to access the second account from a second user device; and determine whether to provide the second user device access to the second account based on the second enrollment voice and the second transformed voice.

7. The apparatus of claim 1, wherein the target voice has fifth voice-specific features different than the third voice-specific features of the transformed voice and the first voice-specific features of the enrollment voice.

8. A non-transitory machine readable storage medium comprising instructions to cause programmable circuitry to at least:

associate an enrollment voice with an account, a first voice transformation applied to a first voice input to produce the enrollment voice, the first voice transformation to cause the enrollment voice to include first voice-specific features different from second voice-specific features of the first voice input;

access a transformed voice associated with a second voice input provided in association with a request to access the account from a user device, the first voice transformation or a second voice transformation-applied to the second voice input to produce the transformed voice, the first voice transformation or the second voice transformation to cause the transformed voice to have third voice-specific features different from fourth voice-specific features of the second voice input, linguistic content extracted from the second voice input and merged with the third voice-specific features to produce the transformed voice; and determine whether to provide the user device access to the account based on the first voice-specific features and the third voice-specific features.

9. The non-transitory machine readable storage medium of claim 8, wherein the instructions are to cause the programmable circuitry to determine whether to apply the first voice transformation or the second voice transformation to the second voice input based on at least one of information associated with the user device that provided the request or an indication provided by a user requesting access to the account at the user device.

10. The non-transitory machine readable storage medium of claim 8, wherein the first voice transformation is applied to the second voice input to produce the transformed voice, and wherein the instructions are to cause the programmable circuitry to adjust the second voice input based on a relationship between the first voice input and a target voice when applying the first voice transformation.

11. The non-transitory machine readable storage medium of claim 10, wherein the instructions are to cause the programmable circuitry to map the second voice-specific features to the first voice-specific features to develop the first voice transformation.

12. The non-transitory machine readable storage medium of claim 10, wherein the target voice has fifth voice-specific features different than the third voice-specific features of the transformed voice and the first voice-specific features of the enrollment voice.

13. The non-transitory machine readable storage medium of claim 8, wherein the first voice-specific features, the second voice-specific features, the third voice-specific features, and the fourth voice-specific features include at least one of mel-frequency cepstral coefficients, perceptual linear prediction coefficients, i-vectors, or x-vectors.

14. The non-transitory machine readable storage medium of claim 8, wherein the enrollment voice is a first enrollment voice, the account is a first account, the transformed voice is a first transformed voice, and the user device is a first user device, and wherein the instructions are to cause the programmable circuitry to:

identify a second enrollment voice associated with a second account, the second voice transformation applied to a third voice input to produce the second enrollment voice;

access a second transformed voice associated with a third voice input provided in association with a request to access the second account from a second user device; and determine whether to provide the second user device access to the second account based on the second enrollment voice and the second transformed voice.

15. A method comprising:

associating an enrollment voice with an account, a first voice transformation applied to a first voice input to produce the enrollment voice, the first voice transformation to cause the enrollment voice to include first voice-specific features different from second voice-specific features of the first voice input;

accessing a transformed voice associated with a second voice input provided in association with a request to access the account from a user device, the first voice transformation or a second voice transformation applied to the second voice input to produce the transformed voice, the first voice transformation or the second voice transformation to cause the transformed voice to have third voice-specific features different from fourth voice-specific features of the second voice input, the first voice transformation and the second voice transformation applying different pole rotations to the second voice input; and determining whether to provide the user device access to the account based on the first voice-specific features and the third voice-specific features.

16. The method of claim 15, further including determining whether to apply the first voice transformation or the second voice transformation to the second voice input based on at least one of information associated with the user device that provided the request or an indication provided by a user requesting access to the account at the user device.

17. The method of claim 15, wherein the first voice transformation is applied to the second voice input to produce the transformed voice, and further including adjusting the second voice input based on a relationship between the first voice input and a target voice when applying the first voice transformation.

18. The method of claim 17, further including mapping the second voice-specific features to the first voice-specific features to develop the first voice transformation.

19. The method of claim 17, further including preserving linguistic content of the second voice input when applying the first voice transformation.

20. The method of claim 15, wherein the enrollment voice is a first enrollment voice, the account is a first account, the transformed voice is a first transformed voice, and the user device is a first user device, and further including:

identifying a second enrollment voice associated with a second account, the second voice transformation applied to a third voice input to produce the second enrollment voice;

accessing a second transformed voice associated with a third voice input provided in association with a request to access the second account from a second user device; and determining whether to provide the second user device access to the second account based on the second enrollment voice and the second transformed voice.

* * * * *